US010075038B2

(12) United States Patent
Suzuki

(10) Patent No.: US 10,075,038 B2
(45) Date of Patent: Sep. 11, 2018

(54) POWER GENERATION INPUT DEVICE

(71) Applicant: ALPS ELECTRIC CO., LTD., Tokyo (JP)

(72) Inventor: Katsutoshi Suzuki, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 423 days.

(21) Appl. No.: 15/057,576

(22) Filed: Mar. 1, 2016

(65) Prior Publication Data

US 2016/0181878 A1 Jun. 23, 2016

Related U.S. Application Data

(63) Continuation of application No. PCT/JP2014/072466, filed on Aug. 27, 2014.

(30) Foreign Application Priority Data

Sep. 2, 2013 (JP) .................. 2013-181257
Jul. 11, 2014 (JP) .................. 2014-143553

(51) Int. Cl.
*H02K 35/02* (2006.01)
*H02K 1/34* (2006.01)

(52) U.S. Cl.
CPC ............... *H02K 1/34* (2013.01); *H02K 35/02* (2013.01)

(58) Field of Classification Search
CPC ......... H02K 1/34; H02K 35/02; H02K 7/1853
See application file for complete search history.

(56) References Cited

U.S. PATENT DOCUMENTS 7,233,087 B2 * 6/2007 Watson .................. H02K 53/00
 310/103
7,235,909 B2 * 6/2007 Moe ....................... H02K 49/10
 310/152

(Continued)

FOREIGN PATENT DOCUMENTS

AU 2012200662 A1 8/2012
CA 2767166 A1 8/2012

(Continued)

OTHER PUBLICATIONS

International Search Report for corresponding International Patent Application No. PCT/JP2014/072466, dated Nov. 11, 2014, 5 pages.

*Primary Examiner* — Dang Le
(74) *Attorney, Agent, or Firm* — Brinks Gilson & Lione

(57) ABSTRACT

A power generation input device includes a rotational magnet body that has a magnet, an N-pole member placed near the N pole of the magnet, and an S-pole member placed near the S-pole of the magnet, the rotational magnet body being supported so as to be rotatable around a rotational center line; a magnetic member; coils; and a manipulation body. The N-pole member has an N-pole end, which extends in a direction more away from the rotational center line than the end of the magnet. The S-pole member has an S-pole end, which extends in a direction more away from the rotational center line than the end of the magnet. The N-pole end and S-pole end are oppositely disposed in a plane parallel to the rotational center line with a gap intervening between them, the gap extending in a direction inclined with respect to the rotational center line.

8 Claims, 33 Drawing Sheets

(56) References Cited

U.S. PATENT DOCUMENTS

2012/0199454 A1 8/2012 Guillot et al.
2013/0010510 A1 1/2013 Yuji et al.

FOREIGN PATENT DOCUMENTS

| EP | 2485203 A1 | 8/2012 |
|----|------------|--------|
| FR | 2971358 A1 | 8/2012 |
| JP | 2009199961 A | 9/2009 |
| JP | 2012164658 A | 8/2012 |
| JP | 201321746 A | 1/2013 |
| KR | 20120090815 A | 8/2012 |
| MX | 2012001441 A | 8/2012 |

* cited by examiner

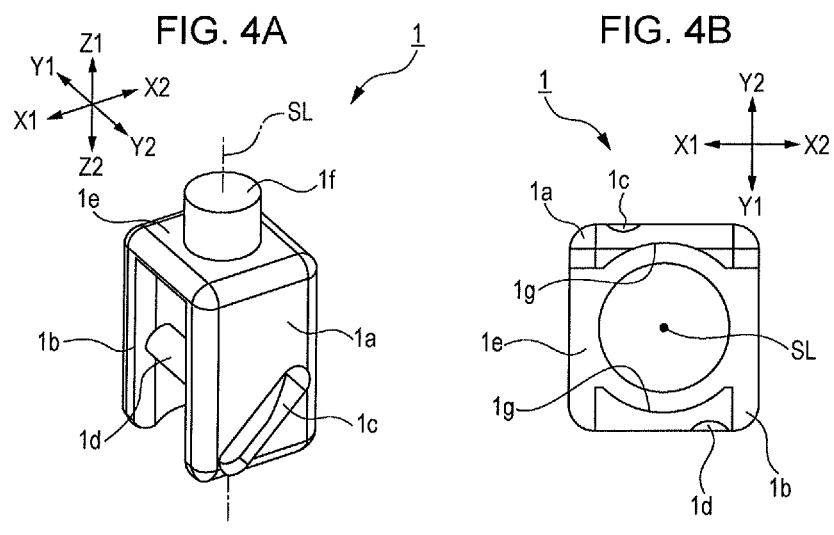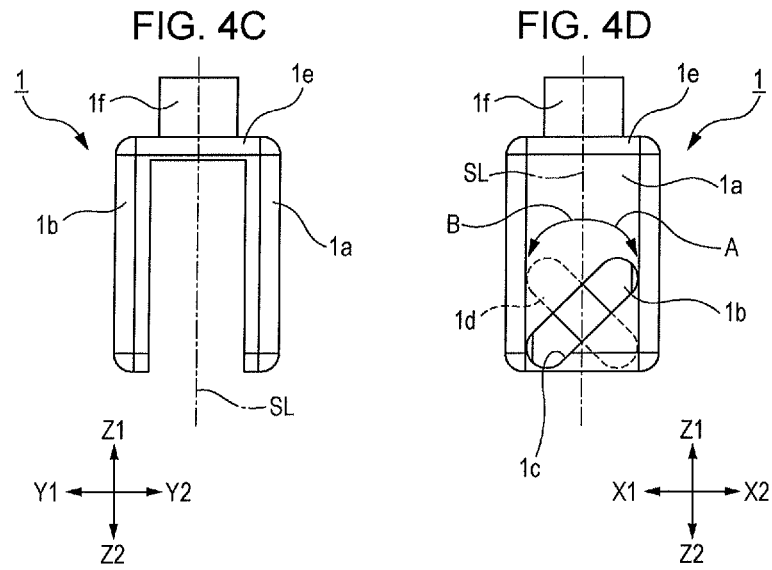

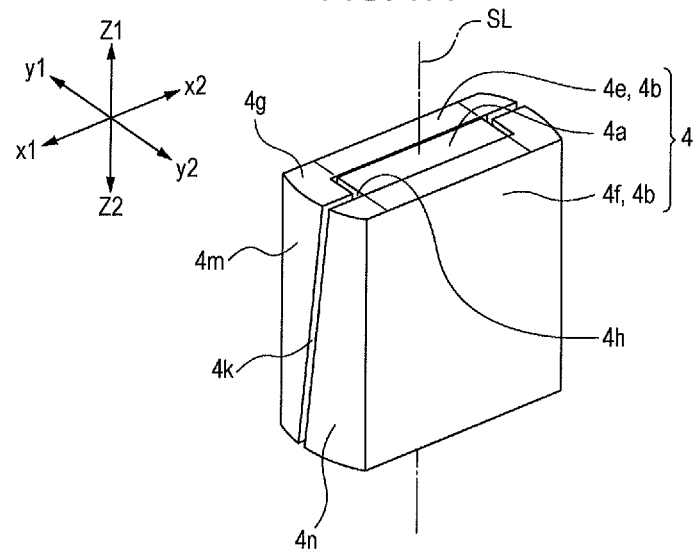
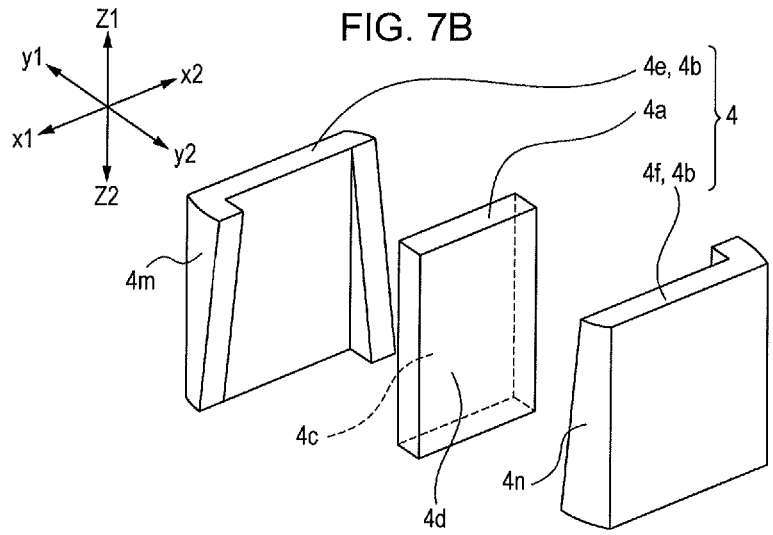

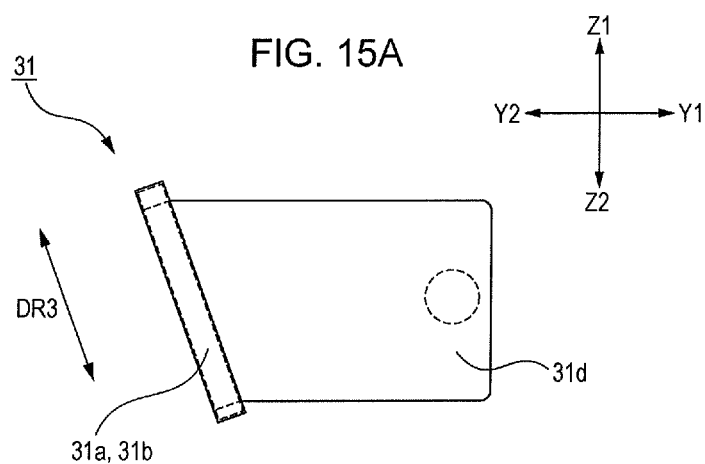
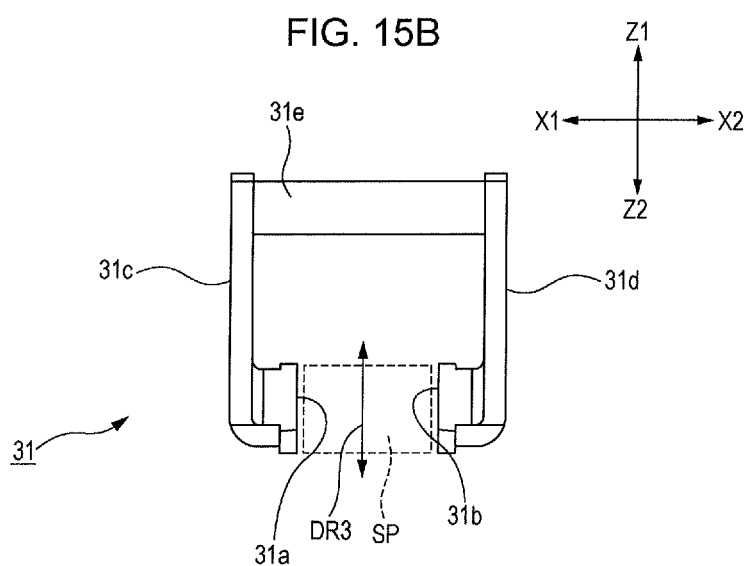

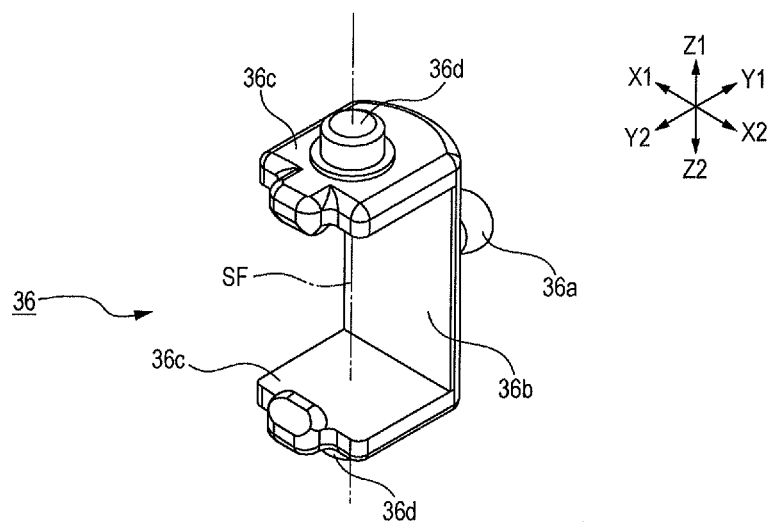
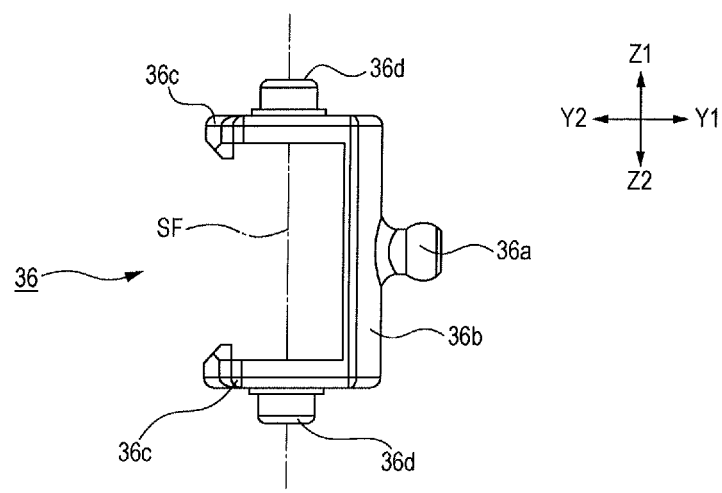

FIG. 29A 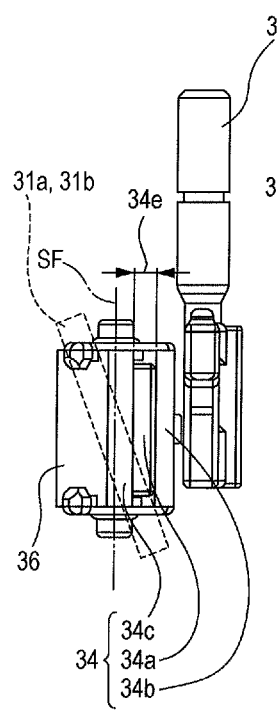 FIG. 29B 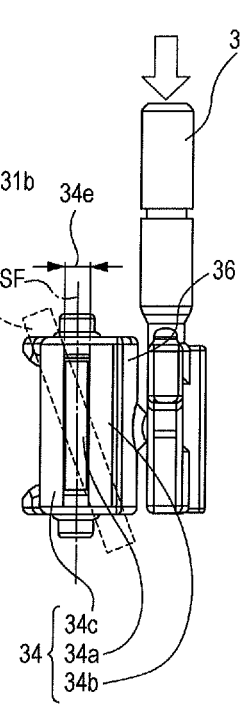 FIG. 29C 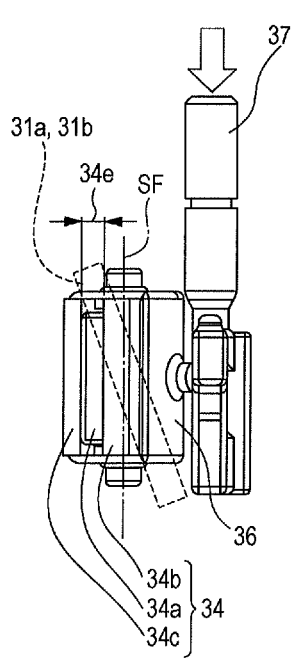
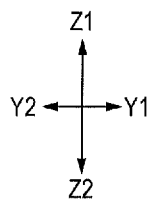 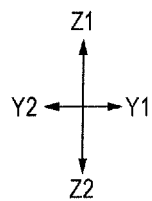 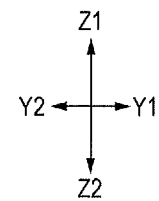

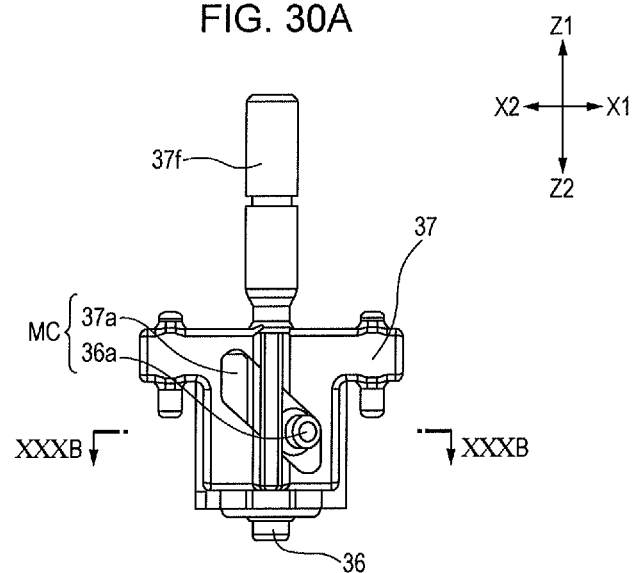
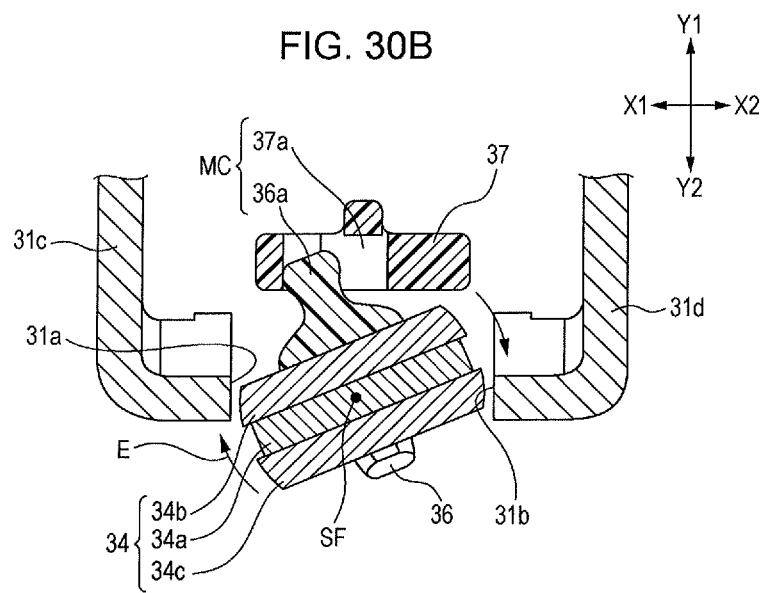

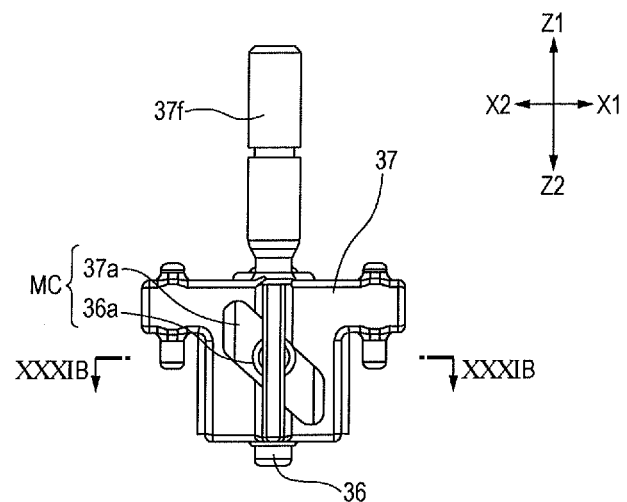
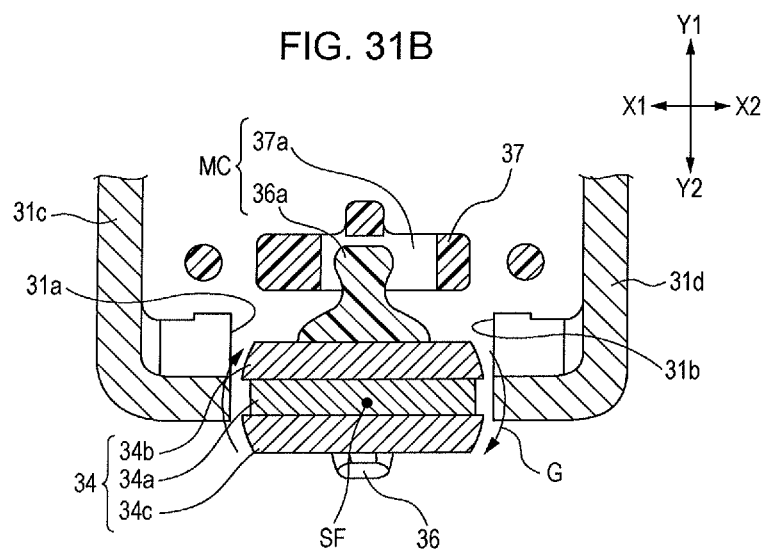

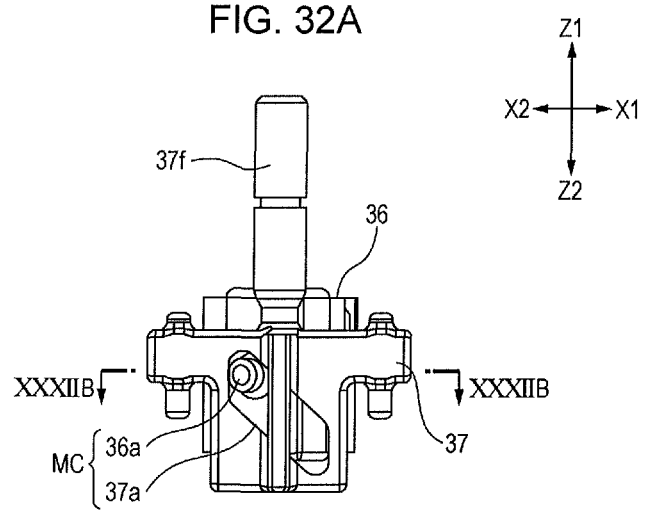
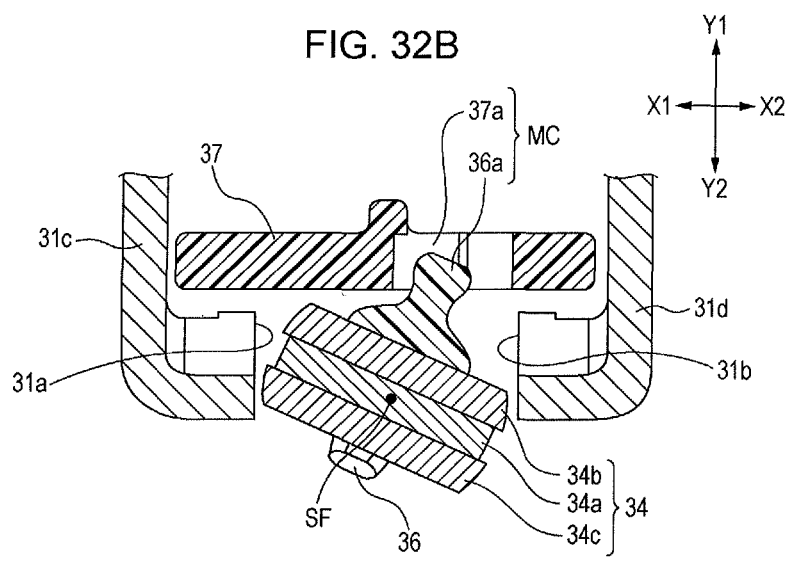

US 10,075,038 B2

POWER GENERATION INPUT DEVICE

CLAIM OF PRIORITY

This application is a Continuation of International Application No. PCT/JP2014/072466 filed on Aug. 27, 2014, which claims benefit of priority to Japanese Patent Application No. 2013-181257 filed on Sep. 2, 2013 and No. 2014-143553 filed on Jul. 11, 2014. The entire contents of each application noted above are hereby incorporated by reference in their entireties.

BACKGROUND

1. Field of the Disclosure

The present disclosure relates to a power generation input device, and more particularly to a power generation input device, with a small cogging torque, that can be adjusted so that a desired manipulation feeling is obtained.

2. Description of the Related Art

To conserve energy and reduce weight, some recent power generation input devices are batteryless input devices. When an input manipulation is performed on this type of power generation input device, it generates electric power needed for the input manipulation itself. The power generation input device includes a magnet and a coil. The magnet or coil is operated in response to the input manipulation, generating an induced electromotive force.

This type of power generation input device is described, for example, as the power generation input device described in Japanese Unexamined Patent Application Publication No. 2012-164658.

The power generation input device described in Japanese Unexamined Patent Application Publication No. 2012-164658 will be described with reference to FIG. 33 to FIGS. 35A and 35B. FIG. 33 is a perspective view illustrating the outside shape of a power generation input device 900 described in Japanese Unexamined Patent Application Publication No. 2012-164658. FIG. 34 is an exploded perspective view illustrating the structure of a power generator 901 incorporated into the power generation input device 900 described in Japanese Unexamined Patent Application Publication No. 2012-164658. FIGS. 35A and 35B are drawings illustrating the seesaw motion of a moving part 910 described in Japanese Unexamined Patent Application Publication No. 2012-164658; FIG. 35A illustrates a state before the moving part 910 starts the seesaw motion, and FIG. 35B illustrates a state after the moving part 910 has performed the seesaw motion.

The power generation input device 900 described in Japanese Unexamined Patent Application Publication No. 2012-164658 is a pushbutton input device having a manipulation part 903, which can be pressed, at the top, as illustrated in FIG. 33. The power generation input device 900 incorporates the power generator 901 illustrated in FIG. 34. When the manipulation part 903 is pressed, the power generator 901 operates in response to the operation of the manipulation part 903, generating electric power. The power generator 901 has a moving part 910, which is formed so as to sandwich a magnet 990 between an upper layer 930 and a lower layer 940, and also has a U-shaped base 920, around which an exciting coil 911 is wound. Both ends of the U-shaped base 920 are inserted into and disposed between the upper layer 930 and the lower layer 940 so as to sandwich the magnet 990 between the ends. The moving part 910 can perform a seesaw motion with the magnet 990 taken as a center, as illustrated in FIGS. 35A and 35B. When the moving part 910 performs a seesaw motion as described above, a magnetic flux passing through the exciting coil 911 changes and a current is thereby generated in the exciting coil 911. The seesaw motion of the moving part 910 will be described below by taking a case, as an example, in which the upper layer 930 of the moving part 910 comes into contact with one end of the U-shaped base 920 and the lower layer 940 comes into contact with the other end of the U-shaped base 920 as illustrated in FIG. 35A, after which the upper layer 930 of the moving part 910 comes into contact with the other end of the U-shaped base 920 and the lower layer 940 comes into contact with the one end of the U-shaped base 920 as illustrated in FIG. 35B. In the state before the seesaw motion starts (see FIG. 35A), the upper layer 930 is magnetically attracted to the one end of the U-shaped base 920 and the lower layer 940 is magnetically attracted to the other end of the U-shaped base 920. When a seesaw motion is performed, the upper layer 930 and lower layer 940 are separated from the U-shaped base 920 against the magnetism. When the midpoint between the upper layer 930 and the lower layer 940 is exceeded, the upper layer 930 is magnetically attracted to the other end of the U-shaped base 920 and the lower layer 940 is magnetically attracted to the one end of the U-shaped base 920, shifting to the state illustrated in FIG. 35B.

During an input manipulation, however, a large force is needed to separate the moving part 910 from the U-shaped base 920 at the beginning of the manipulation and almost no force is needed at the end of the manipulation because the U-shaped base 920 attracts the moving part 910. That is, a cogging torque is generated during the manipulation, so it is difficult to adjust a manipulation feeling to a desired feeling and maneuverability may be worsened.

SUMMARY

A power generation input device includes: a rotational magnet body that has a magnet, an N-pole member placed on the same side as the N pole of the magnet, and an S-pole member placed on the same side as the S-pole of the magnet. The rotational magnet body is supported so as to be rotatable around a rotational center line disposed between the N-pole member and the S-pole member so as to pass through the magnet; a magnetic member disposed so as to sandwich the rotational magnet body with two ends of the magnetic member so that when one of the ends comes close to the N pole. The other end comes close to the S-pole and that when the one end comes close to the S-pole, the other end comes close to the N pole; coils wound around the magnetic member. A manipulation body drives the rotation of the rotational magnet body. The N-pole member has an N-pole end, which extends in a direction more away from the rotational center line than the end of the magnet, in a direction that is orthogonal to the rotational center line and is also orthogonal to a direction in which the N-pole member and S-pole member face each other. Similarly, the S-pole member has an S-pole end, which extends in the direction more away from the rotational center line than the end of the magnet, in a direction that is orthogonal to the rotational center line and is also orthogonal to the direction in which the N-pole member and S-pole member face each other. The N-pole end and S-pole end are oppositely disposed in a plane parallel to the rotational center line with a gap intervening between them, the gap extending in a direction inclined with respect to the rotational center line.

BRIEF DESCRIPTION OF THE DRAWINGS

FIGS. 4A to 4D are drawings illustrating the outside shape of a manipulation body in the first embodiment;

FIGS. 7A and 7B are drawings illustrating the outside shape of a rotational magnet body in the first embodiment;

FIGS. 15A and 15B are drawings illustrating the magnetic member in the third embodiment, FIG. 15A being a side view illustrating the magnetic member when viewed from the side in the X2 direction indicated in FIG. 14, FIG. 15B being a side view illustrating the magnetic member when viewed from the side in the Z1 direction indicated in FIG. 14;

FIGS. 20A and 20B are drawings illustrating a rotating body in the third embodiment, FIG. 20A being a perspective view illustrating the outside shape of the rotating body, FIG. 20B being a side view illustrating the rotating body in a state viewed from the side in the X2 direction indicated in FIG. 20A;

FIGS. 29A to 29C are drawings illustrating the motions of the sliding member, rotating body, and rotational magnet body in a case in which an input manipulation is performed in the third embodiment, FIG. 29A being a schematic drawing illustrating a positional relationship in an initial state, FIG. 29B being a schematic drawing illustrating a positional relationship in a state in the middle of the input manipulation, FIG. 29C being a schematic drawing illustrating a positional relationship at the completion of the input manipulation, only the sliding member, rotating body, and rotational magnet body being illustrated to simplify explanation;

FIGS. 30A and 30B are schematic diagrams illustrating a positional relationship among the sliding member, rotating body, and rotational magnet body in the initial state, FIG. 30A being a side view illustrating the sliding member, rotating body, and rotational magnet body in a state viewed from the side in the Y2 direction indicated in FIG. 29A, FIG. 30B being a cross-sectional view taken along line XXXB-XXXB in FIG. 30A;

FIGS. 31A and 31B are schematic diagrams illustrating a positional relationship among the sliding member, rotating body, and rotational magnet body in a state in the middle of the input manipulation, FIG. 31A being a side view illustrating the sliding member, rotating body, and rotational magnet body in a state viewed from the side in the Y2 direction indicated in FIG. 29B, FIG. 31B being a cross-sectional view taken along line XXXIB-XXXIB in FIG. 31A;

FIGS. 32A and 32B are schematic diagrams illustrating a positional relationship among the sliding member, rotating body, and rotational magnet body in a state at the completion of the input manipulation, FIG. 32A being a side view illustrating the sliding member, rotating body, and rotational magnet body in a state viewed from the side in the Y2 direction indicated in FIG. 29C, FIG. 32B being a cross-sectional view taken along line XXXIIB-XXXIIB in FIG. 32A;

DESCRIPTION OF THE EXEMPLARY EMBODIMENTS

First Embodiment

A power generation input device 100 in the first embodiment will be described below.

Figure 1:
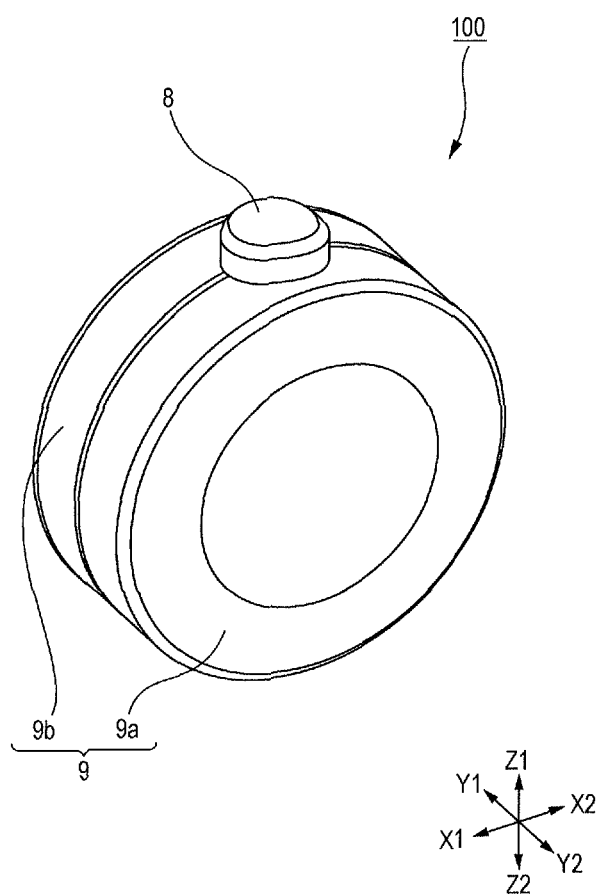
FIG. 1 is a perspective view illustrating the outside shape of a power generation input device in a first embodiment.
Figure 2:
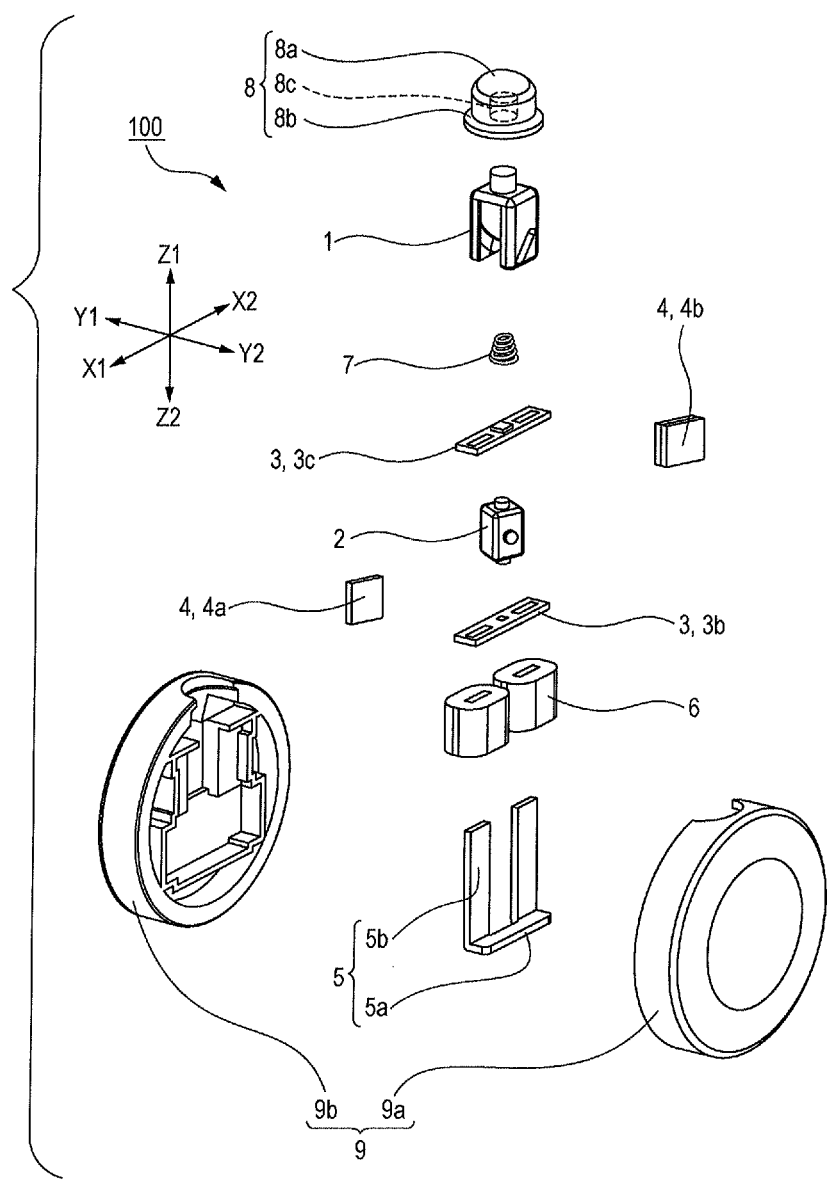
FIG. 2 is an exploded perspective view illustrating the structure of the power generation input device in the first embodiment.
Figure 3A:
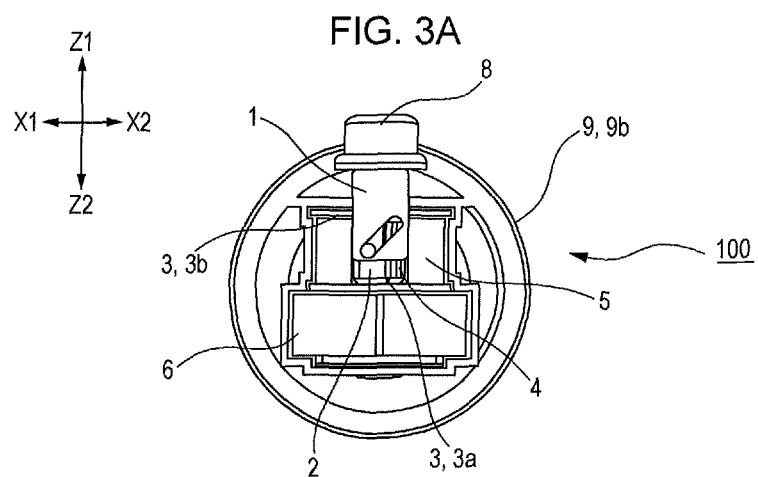
FIGS. 3A and 3B are drawings illustrating a positional relationship among the constituent components of the power generation input device in the first embodiment.
Figure 3B:
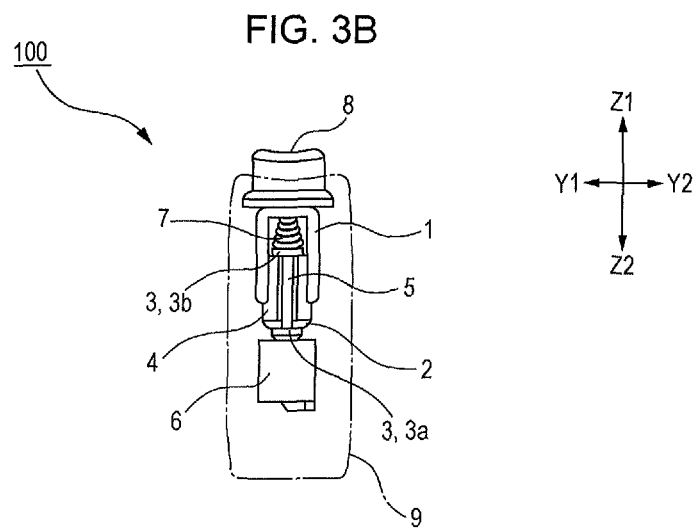
Figure 5A:
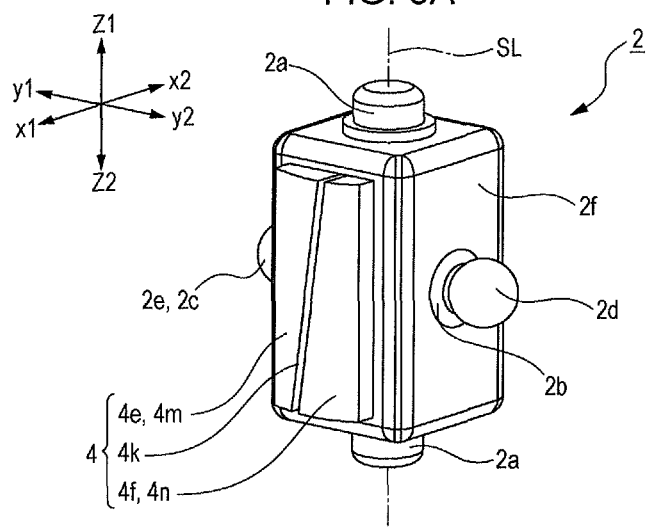
FIGS. 5A to 5C are drawings illustrating the outside shape of a rotational body in the first embodiment.
Figure 5B:
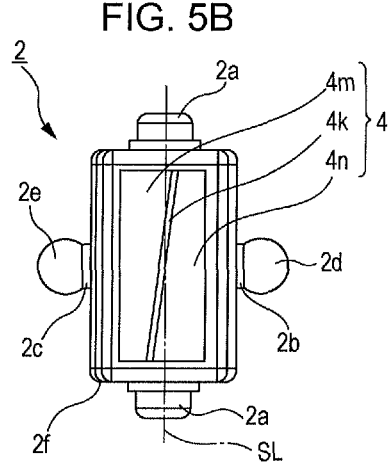
Figure 5C:
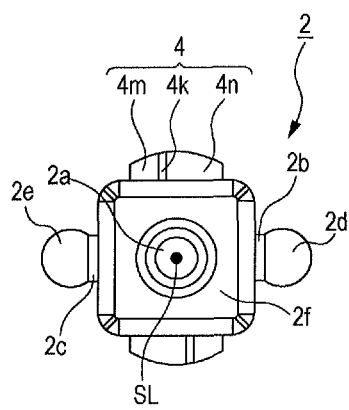
Figure 6:
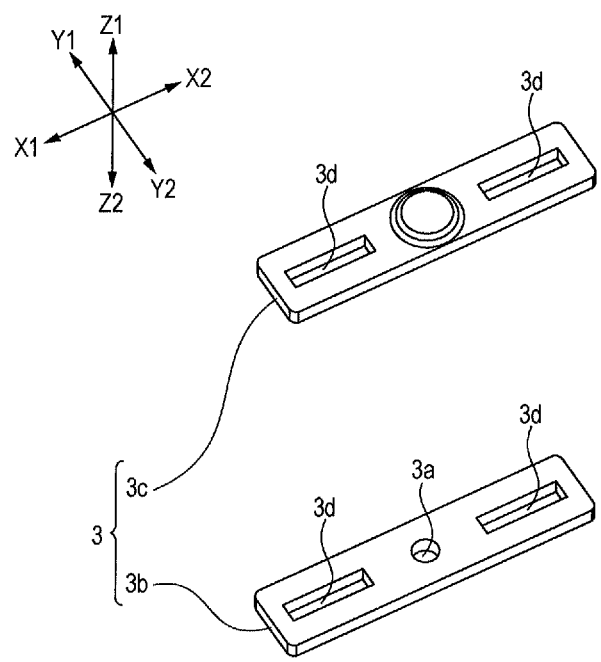
FIG. 6 is a perspective view illustrating the outside shape of a supporting body in the first embodiment.
Figure 8A:
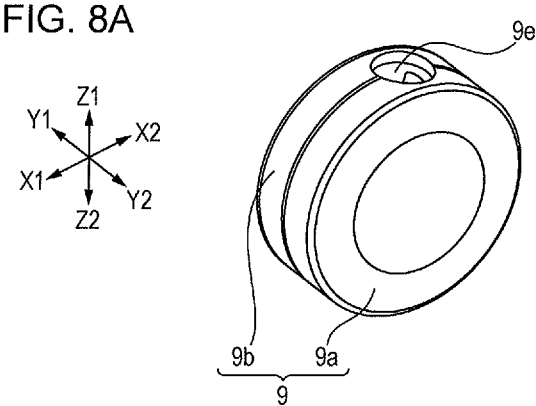
FIGS. 8A to 8C are drawings illustrating a case in the first embodiment.
Figure 8B:
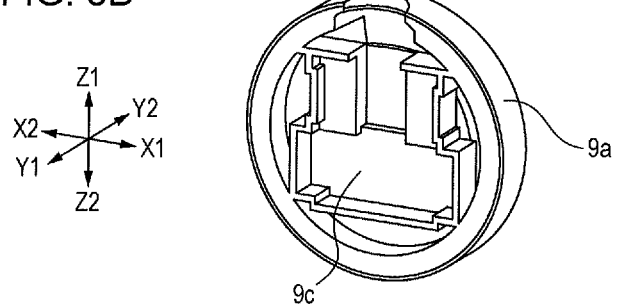
Figure 8C:
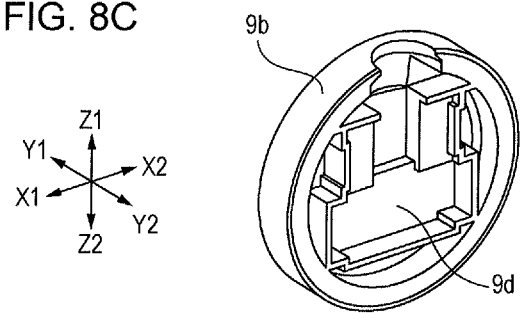

First, constituent components included in the power generation input device 100 in the first embodiment will be described with reference to FIG. 1 to FIGS. 8A to 8C. FIG. 1 is a perspective view illustrating the outside shape of the power generation input device 100 in the first embodiment. FIG. 2 is an exploded perspective view illustrating the structure of the power generation input device 100 in the first embodiment. FIGS. 3A and 3B are drawings illustrating a positional relationship among the constituent components of the power generation input device 100 in the first embodiment; FIG. 3A is a plan view of the power generation input device 100 in FIG. 1 in a state viewed from the side in the Y2 direction, and FIG. 3B is a side view of the power generation input device 100 in FIG. 1 in a state viewed from the side in the X1 direction. In FIG. 3A, a first case 9a is not illustrated. FIGS. 4A to 4D are drawings illustrating the outside shape of a manipulation body 1 in the first embodiment; FIG. 4A is a perspective view illustrating the outside shape of the manipulation body 1, FIG. 4B is a bottom view illustrating the manipulation body 1 viewed from the side in the Z2 direction indicated in FIG. 4A, FIG. 4C is a front view illustrating the manipulation body 1 viewed from the side in the X1 direction indicated in FIG. 4A, and FIG. 4D is a side view illustrating the manipulation body 1 viewed from the side in the Y2 direction indicated in FIG. 4A. FIGS. 5A to 5C are drawings illustrating the outside shape of a rotational body 2 in the first embodiment; FIG. 5A is a perspective view illustrating the outside shape of the rotational body 2, FIG. 5B is a front view illustrating the rotational body 2 viewed from the side in the X1 direction indicated in FIG. 5A, and FIG. 5C is a top view illustrating the rotational body 2 viewed from the side in the Z1 direction indicated in FIG. 5A. FIG. 6 is a perspective view illustrating the outside shape of a supporting body 3 in the first embodiment. FIGS. 7A and 7B are drawings illustrating the outside shape of a rotational magnet body 4 in the first embodiment; FIG. 7A is a perspective view illustrating the outside shape of the rotational magnet body 4, and FIG. 7B is an exploded perspective view illustrating a state into which the rotational magnet body 4 has been disassembled. FIGS. 8A to 8C are drawings illustrating a case 9 in the first embodiment; FIG. 8A is a perspective view illustrating the outside shape of the case 9, FIG. 8B is a perspective view illustrating the outside shape of a first case 9a, and FIG. 8C is a perspective view illustrating the outside shape of a second case 9b.

The directions indicated by the upper-case letters X1, X2, Y1, Y2, Z1, and Z2 respectively correspond to the backward, forward, left, right, upward, and downward directions in FIG. 1. The directions indicated by the lower-case letters, x1, x2, y1, and y2 are directions with respect to the rotational body 2. The x1, x2, y1, and y2 directions substantially match the X1, X2, Y1, and Y2 directions. However, the x1, x2, y1, and y2 directions respectively have a certain angle with respect to the X1, X2, Y1, and Y2 directions, according to the rotational position.

The power generation input device 100 includes the manipulation body 1, the rotational body 2, the supporting body 3, the rotational magnet body 4, a magnetic member 5, coils 6, an urging member 7, a manipulation knob 8, and the case 9 as illustrated in FIG. 2. When the manipulation knob 8, which is disposed so as to protrude toward the outside as illustrated in FIG. 1, is pressed, an input manipulation is performed on the power generation input device 100. The power generation input device 100 can generate electric power by itself due to operations of its constituent components involved in the input manipulation.

The manipulation body 1 is made of a synthetic resin. The manipulation body 1 has a top plate 1e formed in a rectangular-plate-like shape as illustrated in FIG. 4A. At the center of the upper surface (surface on the side in the Z1 direction) of the top plate 1e, a connection protrusion 1f is formed in a columnar shape so as to protrude upwardly. The central line of the columnar shape of the connection protrusion 1f will be referred to as the rotational center line SL. As illustrated in FIG. 4C, the manipulation body 1 also has a first driving part 1a formed in a plate-like shape so as to extend downwardly from one end (end on the side in the Y2 direction) of the lower surface (surface on the side in the Z2 direction) of the top plate 1e and a second driving part 1b formed in a plate-like shape so as to extend downwardly from the other end (end on the side in the Y1 direction) of the lower surface. The first driving part 1a and second driving part 1b are formed so as to be parallel to each other and to be parallel to the rotational center line SL. Arc surfaces 1g are formed in an arc concave shape on a surface facing the first driving part 1a and a surface facing the second driving part 1b. The manipulation body 1 also has a first driving groove 1c formed so as to pass through the first driving part 1a and a second driving groove 1d formed so as to pass through the second driving part 1b. The first driving groove 1c extends so as to be inclined with respect to the rotational center line SL in the direction indicated by the arrow A in FIG. 4D. The second driving groove 1d extends so as to be inclined with respect to the rotational center line SL in the direction, indicated by the arrow B, that is opposite to the direction in which the first driving groove 1c is inclined. The inclination angle through which the first driving groove 1c is inclined with respect to the rotational center line SL in the direction indicated by the arrow A is 45 degrees. The inclination angle through which the second driving groove 1d is inclined with respect to the rotational center line SL in the direction indicated by the arrow B is also 45 degrees. The first driving groove 1c and second driving groove 1d are formed at positions at which they face each other with the rotational center line SL intervening between them.

The rotational body 2, which is made of a synthetic resin, is formed in a rectangular parallelepiped shape as illustrated in FIGS. 5A to 5C. The rotational body 2 has a base body 2f, which is formed in a rectangular parallelepiped shape that extends in the up-and-down direction (Z1-Z2 direction). The size of the base body 2f is such that it can be placed in a space formed between the arc surfaces 1g, illustrated in FIG. 4B, which are formed between the first driving part 1a and second driving part 1b of the manipulation body 1. The rotational body 2 also has a rotational axis 2a formed in a columnar shape at the center of the upper surface of the base body 2f so as to extend upwardly and another rotational axis 2a formed at the center of the lower surface of the base body 2f so as to extend downwardly. The center lines of the columnar shapes of the upper and lower rotational axes 2a coincide with the rotational center line SL. The rotational body 2 also has a first driven part 2b extending from a side of the base body 2f toward one side (on the side in the y2 direction) with respect to the rotational center line SL and a second driven part 2c extending from the other side of the base body 2f toward the other side (on the side in the y1 direction). The first driven part 2b and second driven part 2c are disposed at symmetric positions with respect to the rotational center line SL. The first driven part 2b has a first spherical part 2d, which is formed in a spherical shape, at the extended end. The second driven part 2c has a second spherical part 2e, which is formed in a spherical shape, at the extended end. The size of the first spherical part 2d is such that it can be inserted into the first driving groove 1c formed in the manipulation body 1. The size of the second spherical part 2e is such that it can be inserted into the second driving groove 1d formed in the manipulation body 1. The rotational magnet body 4 is built into the inside of the rotational body 2. Part of the rotational magnet body 4 protrudes from a side, of the base body 2f, on which neither the first driven part 2b nor the second driven part 2c is formed. The rotational center line SL passes through the center of the rotational magnet body 4.

The supporting body 3, which is made of a synthetic resin, includes a first support 3b and a second support 3c, which are formed in a plate-like shape, as illustrated in FIG. 6. The first support 3b and second support 3c have the same shape. The supporting body 3 has rotational bearings 3a at the centers of the first support 3b and second support 3c. Each rotational bearing 3a is a circular hole into which the relevant rotational axis 2a of the rotational body 2 can be inserted. The supporting body 3 also has engaging holes 3d, which are rectangular through-holes, at symmetrical positions on the first support 3b and second support 3c with respect to the rotational bearing 3a.

The rotational magnet body 4 includes a magnet 4a formed in a rectangular parallelepiped shape and two magnetic pole plates 4b, which are made of a magnetic substance and are formed in a rectangular plate-like shape, as illustrated in FIGS. 7A and 7B. The rotational magnet body 4 is disposed with the magnet 4a held from a surface on the same side as the S-pole 4c of the magnet 4a and from a surface on the same side as its N pole 4d. When the rotational magnet body 4 is attached to the rotational body 2, the rotational center line SL passes through the center of the rotational magnet body 4 as described above. The S-pole 4c of the magnet 4a is magnetized on a surface on the side in the y1 direction illustrated in FIGS. 7A and 7B and the N pole 4d is magnetized on a surface on the side in the y2 direction, for example. One magnetic pole plate 4b has an N-pole member 4f disposed on the same side as the N pole 4d of the magnet 4a, and the other magnetic pole plate 4b has an S-pole member 4e disposed on the same side as the S-pole 4c of the magnet 4a. The N-pole member 4f has an N-pole end 4h, which extends in a direction more away from the rotational center line SL than the end of the magnet 4a in a direction that is orthogonal to the rotational center line SL and is also orthogonal to a direction in which the N-pole member 4f and S-pole member 4e face each other. Similarly, the S-pole member 4e has an S-pole end 4g, which extends in a direction more away from the rotational center line SL than the end of the magnet 4a in the direction that is orthogonal to the rotational center line SL and is also orthogonal to the direction in which the N-pole member 4f and S-pole member 4e face each other. The N-pole end 4h and S-pole end 4g are oppositely disposed in a plane parallel to the rotational center line SL with a gap 4k intervening between them, the gap 4k extending in a direction inclined with respect to the rotational center line SL. In this embodiment, an N-pole inclined piece 4n is formed at the N-pole end 4h of the N-pole member 4f so as to extend toward the S-pole end 4g, and an S-pole inclined piece 4m is formed at the S-pole end 4g of the S-pole member 4e so as to extend toward the N-pole end 4h; the N-pole end 4h and S-pole end 4g are oppositely disposed and the gap 4k are formed between them. The gap 4k formed on the side in the X1 direction in FIGS. 7A and 7B is inclined from the side in the Y2 direction toward the Y1 direction as the gap 4k extends toward the Z2 direction. Similarly, the gap 4k formed on the side in the X2 direction is inclined from the side in the Y1 direction toward the Y2 direction as the gap 4k extends toward the Z2 direction.

The S-pole member 4e, which is in contact with the S-pole 4c of the magnet 4a, is magnetized to the S-pole 4c, and the N-pole member 4f, which is in contact with the N pole 4d, is magnetized to the N pole 4d. That is, the rotational center line SL is disposed between the N-pole member 4f and the S-pole member 4e so as to pass through the magnet 4a, and the rotational magnet body 4 is attached to the rotational body 2 so that the N pole 4d is disposed on one side of the rotational body 2 with respect to the rotational center line SL and the S-pole 4c is disposed on the other side. The magnet 4a is disposed at the center between the magnetic pole plates 4b, and its size is such that the magnet 4a does not extend beyond the magnetic pole plates 4b. Protrusions extending from a side surface of the rotational body 2 are the N-pole inclined piece 4n and S-pole inclined piece 4m of the magnetic pole plates 4b. The size of the rotational magnet body 4 is such that it can be placed in a space formed between the arc surfaces 1g, which are formed between the first driving part 1a and the second driving part 1b of the manipulation body 1. The N-pole inclined piece 4n and S-pole inclined piece 4m, which face their respective arc surfaces 1g, are formed in a shape matching the arc surface 1g.

The magnetic member 5, which is made of a magnetic plate, has a base 5a formed in a rectangular-plate-like shape as illustrated in FIG. 2. Yokes 5b are formed on one side (on the side in the Y1 direction) at both ends of the base 5a in its longitudinal direction (X1-X2 direction), so as to extend in parallel to each other. Each yoke 5b extends in a direction (Z1 direction) perpendicular to the plate surface of the base 5a. The size of the yoke 5b is such that it can be inserted into the engaging hole 3d in the supporting body 3.

The coil 6, which is made of a metal wire, is formed by winding the metal wire on the root of the yoke 5b of the magnetic member 5 as illustrated in FIGS. 3A and 3B.

The urging member 7, which is made of a metal wire, is a helical spring formed so that it is helically wound and its diameter is increased from the end in the Z1 direction toward the end in the Z2 direction as illustrated in FIG. 2. The size of the urging member 7 is such that it can be placed in a space formed between the first driving part 1a and second driving part 1b of the manipulation body 1 illustrated in FIGS. 4A to 4D.

The manipulation knob 8, which is made of a synthetic resin, is formed in a cylindrical shape as illustrated in FIG. 2. The manipulation knob 8 has a button 8a formed in a cylindrical shape with only one end (end in the Z2 direction) open. At the one end of the button 8a, the manipulation knob 8 has a collar 8b extending to the outside from the cylindrical surface of the manipulation knob 8. The collar 8b is formed over the entire circumference of the manipulation knob 8 along the cylindrical surface. The manipulation knob 8 also has an engaging hole 8c, which is a circular hole, on the same side as the opening of the button 8a. The size of the engaging hole 8c is such that the connection protrusion if of the manipulation body 1 can be inserted into the engaging hole 8c.

The case 9, which is made of a synthetic resin, includes a first case 9a and a second case 9b as illustrated in FIG. 8A to 8C; the first case 9a has an opening at the end on one side (on the side in the Y1 direction) and internally has a first storing part 9c, and the second case 9b has an opening at the end on the other side (on the side in the Y2 direction) and internally has a second storing part 9d. The first case 9a and second case 9b are engaged with each other so that the first storing part 9c and second storing part 9d face each other, forming the case 9 in a cylindrical shape. The case 9 has an opening 9e in a circular shape at part on the cylindrical surface. The opening 9e communicates with the first storing part 9c and second storing part 9d. A space formed by the first storing part 9c and second storing part 9d is large enough to store constituent components other than the case 9. The space can also hold and guide the constituent components other than the case 9. The size of the opening 9e is such that the button 8a of the manipulation knob 8 can be inserted into the opening 9e. The opening 9e has a smaller diameter than the collar 8b.

Next, the structure of the power generation input device 100 will be described with reference to FIGS. 3A and 3B. In FIGS. 3A and 3B referenced in the following descriptions, the reference characters of the parts of the constituent components are omitted to simplify the descriptions. For the parts of the constituent components, it is preferable to reference related drawings.

As illustrated in FIGS. 3A and 3B, each coil 6 is wound on the root of one yoke 5b of the magnetic member 5. With the rotational axes 2a inserted into the rotational bearings 3a, the rotational body 2 is sandwiched between the first support 3b disposed above the rotational body 2 and the second support 3c disposed below the rotational body 2. Thus, the rotational bearings 3a rotatably support the rotational axes 2a and the supporting body 3 supports the rotational body 2 and rotational magnet body 4 so as to rotatable around the rotational center line SL. The yokes 5b of the magnetic member 5 with the coils 6 wound are passed through the engaging holes 3d in the first support 3b and the engaging holes 3d in the second support 3c from below the first support 3b. The yokes 5b of the magnetic member 5 are inserted up to positions at which the coils 6 come into contact with the first support 3b. Thus, the magnetic member 5 holds the rotational body 2 and supporting body 3 and is disposed so as to sandwich the rotational magnet body 4 with one end (one yoke 5b) and the other end (the other yoke 5b). The manipulation body 1 is placed on the second support 3c in a state in which the first spherical part 2d of the first driven part 2b inserted into the first driving groove 1c and the second spherical part 2e of the second driven part 2c is inserted into the second driving groove 1d. The urging member 7, which is sandwiched between the second support 3c and the manipulation body 1, urges the manipulation body 1 upwardly. The manipulation knob 8 is placed on the manipulation body 1 in a state in which the connection protrusion if is inserted into the engaging hole 8c. The manipulation body 1, rotational body 2, supporting body 3, rotational magnet body 4, magnetic member 5, coils 6, urging member 7, and manipulation knob 8, which have been engaged as described above, are placed in the first storing part 9c in the first case 9a and the second storing part 9d in the second case 9b, in a state in which the button 8a of the manipulation knob 8 protrudes from the opening 9e in the case 9. When the first case 9a and second case 9b are engaged with each other, a case is formed and the power generation input device 100 is formed. The manipulation body 1 and manipulation knob 8 are guided by the case 9 so as to be capable of reciprocating. Due to the reciprocation motion of the manipulation body 1, the rotational body 2 is rotatably held.

Figure 9A:
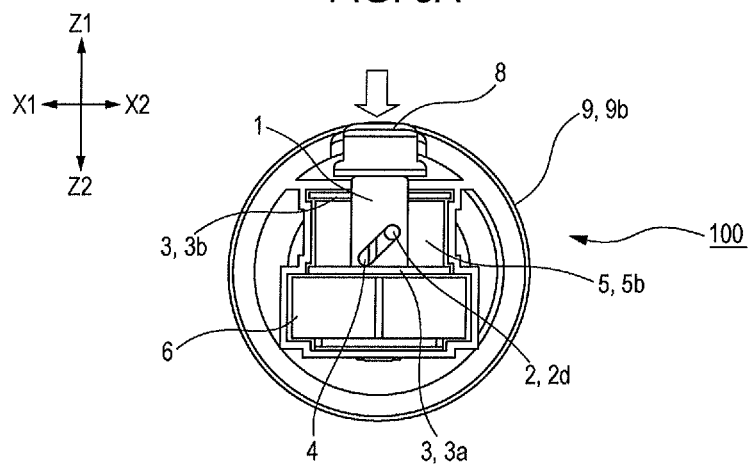
FIGS. 9A and 9B are drawings illustrating a positional relationship among constituent components when a manipulation knob is pressed in the Z2 direction in a state illustrated in FIGS. 3A and 3B.
Figure 9B:
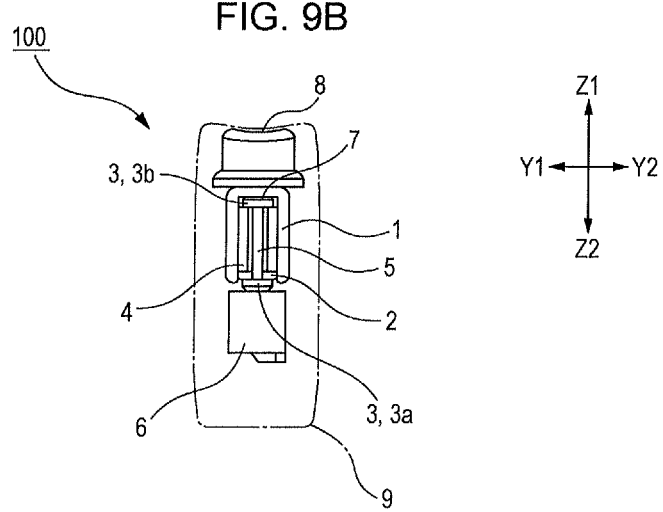
Figure 10A:
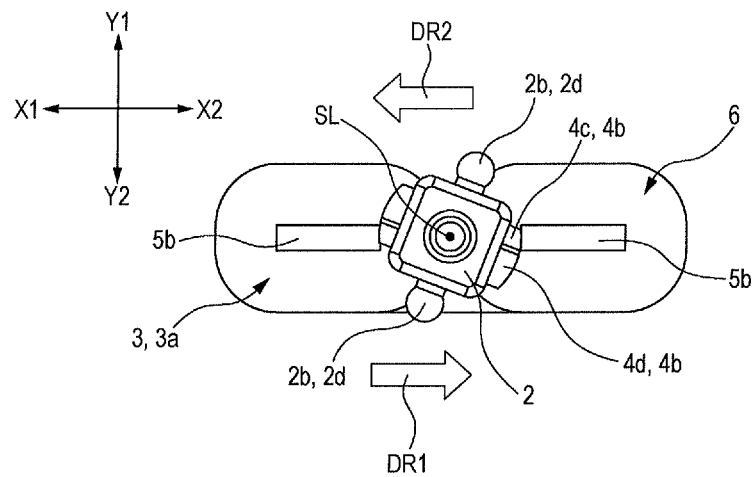
FIGS. 10A and 10B are drawings illustrating the rotation of the rotational body when the manipulation knob is pressed, when viewed from the Z1 direction indicated in FIG. 1.
Figure 10B:
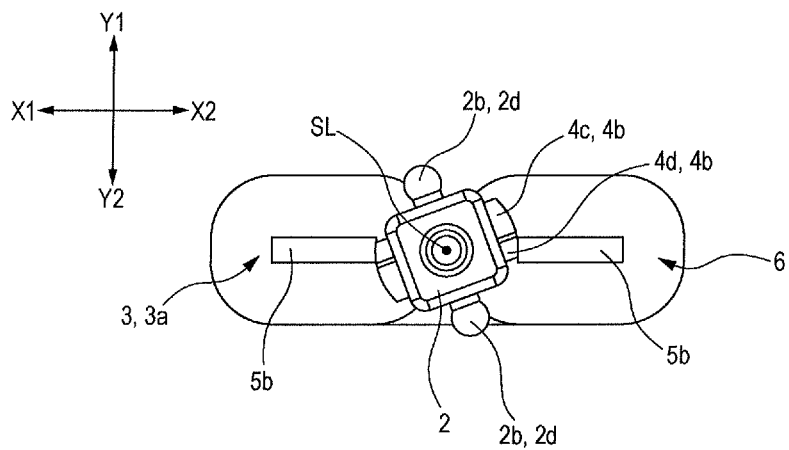

Next, operations of the power generation input device 100 will be described with reference to FIGS. 3A and 3B, FIGS. 9A and 9B, and FIGS. 10A and 10B. FIGS. 9A and 9B are drawings illustrating a positional relationship among constituent components when the manipulation knob 8 is pressed in the Z2 direction in a state illustrated in FIGS. 3A and 3B; FIG. 9A is a plan view illustrating a state when the power generation input device 100 in FIG. 1 is viewed from the side in the Y2 direction, and FIG. 9B is a side view illustrating a state when the power generation input device 100 in FIG. 1 is viewed from the side in the X1 direction. In FIG. 9A, the first case 9a is not illustrated. FIGS. 10A and 10B are drawings illustrating the rotation of the rotational body 2 when the manipulation knob 8 is pressed, when viewed from the Z1 direction indicated in FIG. 1; FIG. 10A is a top view illustrating a state before the manipulation knob 8 is pressed, and FIG. 10B is a top view illustrating a state after the manipulation knob 8 has been pressed. In FIGS. 10A and 10B, the manipulation body 1 and case 9 are not illustrated.

With the power generation input device 100 in a state illustrated in FIGS. 3A and 3B, when the manipulation knob 8 is pressed in the Z2 direction, the manipulation knob 8 presses the manipulation body 1 and the manipulation body 1 slides in a direction in which it has been pressed, entering a state in which the manipulation knob 8 is accommodated in the case 9 as illustrated in FIGS. 9A and 9B. The first spherical part 2d of the rotational body 2 is inserted into and engaged with the first driving groove 1c of the manipulation body 1, which slides, and the second spherical part 2e of the rotational body 2 is inserted into and engaged with the second driving groove 1d. Therefore, due to the sliding of the manipulation body 1, the first spherical part 2d moves in the first driving groove 1c along the first driving groove 1c and the second spherical part 2e moves in the second driving groove 1d along the second driving groove 1d. In FIG. 4D, the first driving groove 1c is inclined 45 degrees with respect to the rotational center line SL, which extends in the direction in which the manipulation body 1 moves, in the direction indicated by the arrow A, and the second driving groove 1d is inclined 45 degrees in the direction indicated by the arrow B, which is opposite to the direction indicated by the arrow A. Therefore, the first spherical part 2d and second spherical part 2e receive a force exerted in a direction orthogonal to the direction in which the manipulation body 1 slides. That is, as illustrated in FIG. 10A, the first driving part 1a of the manipulation body 1 causes the first driving groove 1c (see FIGS. 4A, 4B, and 4D) to engage the first spherical part 2d, drives the first spherical part 2d, and drives the first driven part 2b through the first spherical part 2d in a first direction DR1. At the same time, the second driving part 1b causes the second driving groove 1d to engage the second spherical part 2e, drives the second spherical part 2e, and drives the second driven part 2c through the second spherical part 2e in a second direction DR2, which is opposite to the first direction DR1. Thus, the rotational body 2 is pressed at positions symmetric with respect to the rotational axis 2a and is thereby rotated around the rotational axis 2a, which is set along the rotational center line SL, after which the rotational body 2 is placed in a state illustrated in FIG. 10B. When the manipulation knob 8 is released, the manipulation body 1 is urged by the urging member 7, restoring the manipulation knob 8, manipulation body 1, and rotational body 2 to the state before the manipulation knob 8 has been pressed. Therefore, due to the reciprocating motion of the manipulation body 1, which can reciprocate, the rotational body 2 can rotate.

Due to the reciprocating motion of the manipulation body 1, the rotation of the rotational magnet body 4 is also driven in synchronization with the rotating rotational body 2. The rotational magnet body 4 is placed between the two yokes 5b of the magnetic member 5. Therefore, when the yoke 5b on one end side of the magnetic member 5 comes close to the N pole 4d, the yoke 5b at the other end comes close to the S-pole 4c. When the yoke 5b on the one end side comes close to the S-pole 4c, the yoke 5b at the other end comes close to the N pole 4d. When the rotational magnet body 4 rotates in the vicinity of the magnetic member 5 as described above, a magnetic field that the yokes 5b receive changes and an induced electromotive force is thereby generated. As a result, a current flows in the coils 6. Thus, when an input manipulation is performed, power can be generated.

Effects in this embodiment will be described below.

The power generation input device 100 in the first embodiment has included: the rotational magnet body 4 that has the magnet 4a, the N-pole member 4f placed on the same side as the N pole 4d of the magnet 4a, and the S-pole member 4e placed on the same side as the S-pole 4c of the magnet 4a, the rotational magnet body 4 being supported so as to be rotatable around the rotational center line SL disposed between the N-pole member 4f and the S-pole member 4e so as to pass through the magnet 4a; the magnetic member 5 disposed so as to sandwich the rotational magnet body 4 with two ends of the magnetic member 5 so that when one of the ends comes close to the N pole 4d, the other end comes close to the S-pole 4c and that when the one end comes close to the S-pole 4c, the other end comes close to the N pole 4d; the coils 6 wound around the magnetic member 5; and the manipulation body 1 that drives the rotation of the rotational magnet body 4. The N-pole member 4f has had the N-pole end 4h, which extends in a direction more away from the rotational center line SL than the end of the magnet 4a, in a direction that is orthogonal to the rotational center line SL and is also orthogonal to a direction in which the N-pole member 4f and S-pole member 4e face each other. Similarly, the S-pole member 4e has had the S-pole end 4g, which extends in a direction more away from the rotational center line SL than the end of the magnet 4a, in the direction that is orthogonal to the rotational center line SL and is also orthogonal to the direction in which the N-pole member 4f and S-pole member 4e face each other. The N-pole end 4h and S-pole end 4g have been oppositely disposed in a plane parallel to the rotational center line SL with the gap 4k intervening between them, the gap 4k extending in a direction inclined with respect to the rotational center line SL.

Thus, the S-pole 4c and N pole 4d are separated from each other with the gap 4k taken as a boundary. If the gap 4k extends in a direction parallel to the rotational center line SL, when the rotational magnet body 4 is rotated, the gap 4k moves from one surface of the magnetic member 5 to the other surface at once. Therefore, the magnetic field applied to the magnetic member 5 rapidly changes, generating a cogging torque. By contrast, if the gap 4k extends in a direction inclined with respect to the rotational center line SL, during the movement of the gap 4k from one surface of the magnetic member 5 to the other surface, the gap 4k gradually moves from its one part. Accordingly, the magnetic field applied to the magnetic member 5 also gradually changes. By adjusting the inclination of the gap 4k, the cogging torque can be adjusted to a small value. If a click means formed by using a cam and a plunger is provided separately, adjustment to a desired manipulation feeling is possible. Therefore, it is possible to provide a power generation input device, with a small cogging torque, that can be adjusted so that a desired manipulation feeling is obtained.

With the power generation input device 100 in the first embodiment, the N-pole inclined piece 4n has been preferably formed at the N-pole end 4h of the N-pole member 4f so as to extend toward the S-pole end 4g and the S-pole inclined piece 4m has been preferably formed at the S-pole end 4g of the S-pole member 4e so as to extend toward the N-pole end 4h; the gap 4k has been preferably formed by disposing the N-pole end 4h and S-pole end 4g so as to face each other and disposing the N-pole inclined piece 4n and S-pole inclined piece 4m so as to face each other.

Since the gap 4k is formed with the N-pole inclined piece 4n and S-pole inclined piece 4m facing each other, the gap 4k can be easily inclined and the inclination angle can be easily adjusted. Therefore, it is possible to more easily provide a power generation input device, with a small cogging torque, with which the cogging torque can be easily adjusted and that thereby enables the user to obtain a desired manipulation feeling.

Second Embodiment

A power generation input device 200 in a second embodiment will be described below. The power generation input device 200 in the second embodiment differs from the power generation input device 100 in the first embodiment in the shape of the gap 4k, that is, the shapes of the N-pole inclined piece 4n and S-pole inclined piece 4m. Other than the N-pole inclined piece 4n and S-pole inclined piece 4m, the power generation input device 200 uses the same constituent components as the power generation input device 100 and has the same structure as the power generation input device 100 in the first embodiment. Therefore, the following description will use the names and reference characters in the first embodiment and will focus on differences from the power generation input device 100 in the first embodiment.

Figure 11A:
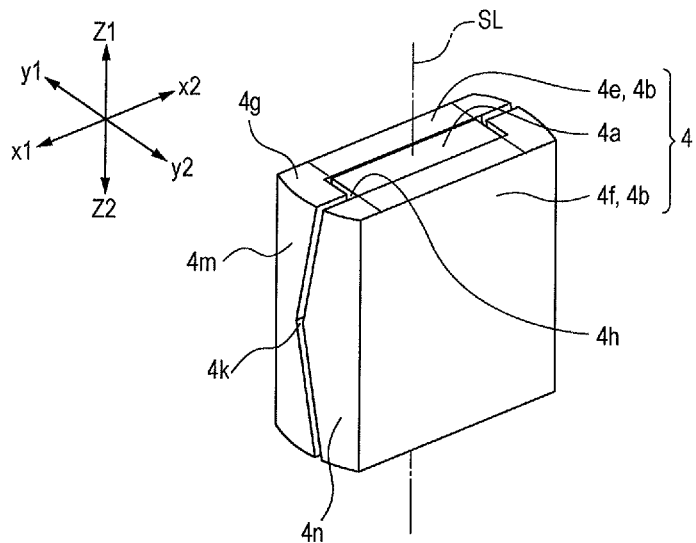
FIGS. 11A and 11B are drawings illustrating the outside shape of the rotational magnet body in a second embodiment.
Figure 11B:
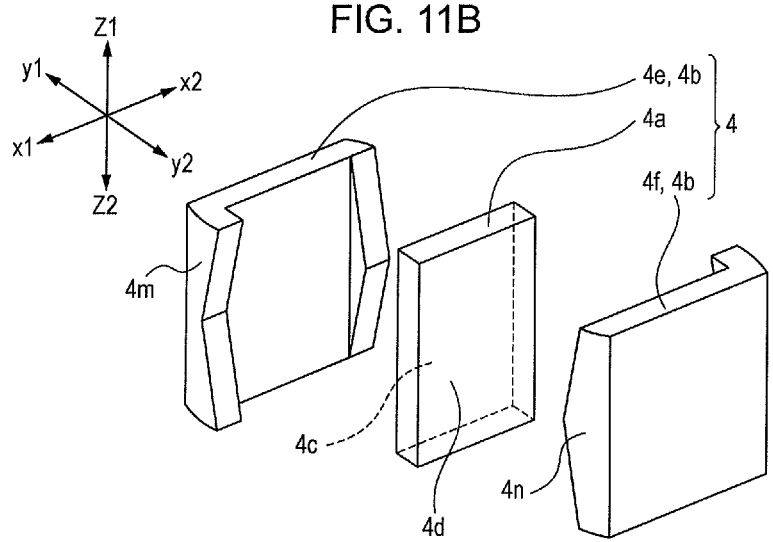

First, constituent components included in the power generation input device 200 in the second embodiment will be described with reference to FIGS. 11A and 11B, focusing only on the rotational magnet body 4. FIGS. 11A and 11B are drawings illustrating the outside shape of the rotational magnet body 4 in the second embodiment; FIG. 11A is perspective view illustrating the outside shape of the rotational magnet body 4, and FIG. 11B is an exploded perspective view of the rotational magnet body 4.

As with the power generation input device 100 in the first embodiment, the rotational magnet body 4 includes the magnet 4a formed in a rectangular parallelepiped shape and two magnetic pole plates 4b, which are made of a magnetic substance and are formed in a rectangular plate-like shape, as illustrated in FIGS. 11A and 11 B. The rotational magnet body 4 is disposed so that the magnet 4a is held from a surface on the same side as the S-pole 4c of the magnet 4a and a surface on the same side as its N pole 4d. One of the N-pole inclined piece 4n and S-pole inclined piece 4m of the magnetic pole plate 4b is preferably formed in a mountain-shape by combining a pair of inclinations, and the other of them is preferably formed in a valley-shape by combining a pair of inclinations. In the second embodiment, the N-pole inclined piece 4n and S-pole inclined piece 4m formed on the side in the X1 direction in the FIGS. 11A and 11B, the N-pole inclined piece 4n is formed in a mountain-shape by combining a pair of inclinations and the S-pole inclined piece 4m is formed in a valley-shape by combining a pair of inclinations. With the N-pole inclined piece 4n and S-pole inclined piece 4m formed on the side in the X2 direction, the N-pole inclined piece 4n is formed in a valley-shape by combining a pair of inclinations and the S-pole inclined piece 4m is formed in a mountain-shape by combining the pair of inclinations. The gap 4k formed by the N-pole inclined piece 4n and S-pole inclined piece 4m is formed in a symmetrical V-shape.

The structure and operation of the power generation input device 200 are the same as those of the power generation input device 100 in the first embodiment, so their description will be omitted.

Effects in the second embodiment will be described below.

With the power generation input device 200 in the second embodiment, one of the N-pole inclined piece 4n and S-pole inclined piece 4m has been preferably formed in a mountain-shape by combining a pair of inclinations and the other of them has been preferably formed in a valley-shape by combining a pair of inclinations.

Therefore, during the movement of the gap 4k from one surface of the magnetic member 5 to the other surface, the gap 4k gradually moves from the vertex of the mountain-shape of the gap 4k or from both ends of the bottom of the mountain-shape. Accordingly, a torque is less likely to be generated in the direction inclined with respect to the rotational center line SL when compared with the gap 4k that is linearly formed. This prevents a portion that functions as the central axis of rotation and a portion that supports that portion from being easily worn unevenly, contributing to a long life of the power generation input device.

With the power generation input device 200 in the second embodiment, the gap 4k has been formed in a symmetrical V-shape.

Accordingly, a difference is made smaller between magnetic fields that are generated above and below the rotational body 2 when the rotation of the rotational body 2 and rotational magnet body 4 is driven. This prevents a torque from being generated easily that inclines the rotational body 2 in a direction inclined with respect to the rotational center line SL, improving the manipulation feeling.

Third Embodiment

Figure 12:
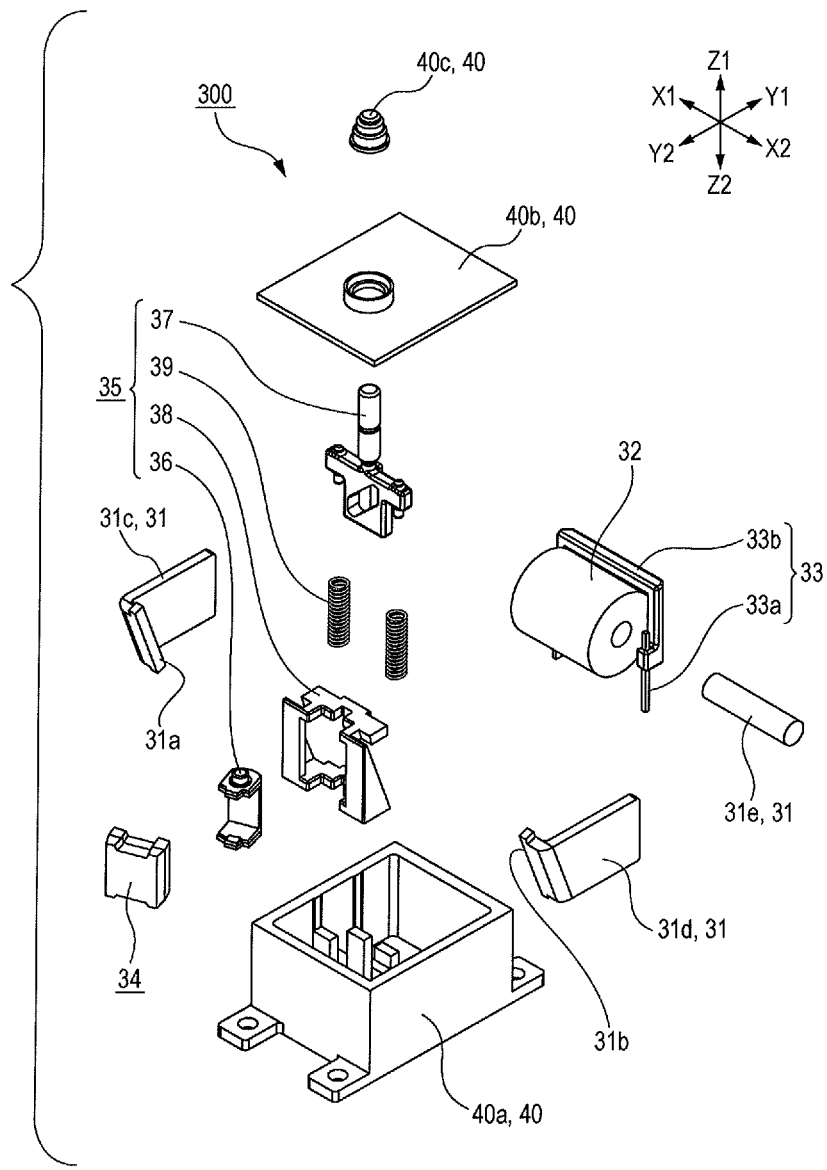
FIG. 12 is an exploded perspective view illustrating the structure of a power generation input device in a third embodiment.
Figure 13:
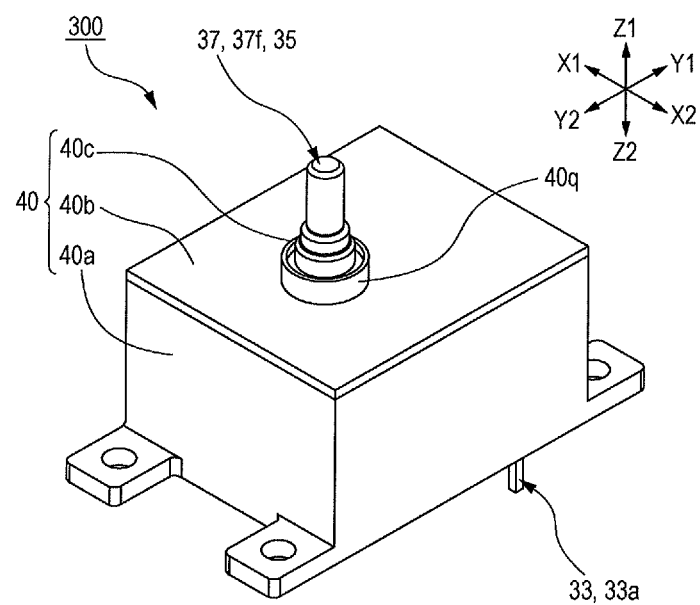
FIG. 13 is a perspective view illustrating the outside shape of the power generation input device in the third embodiment.
Figure 14:
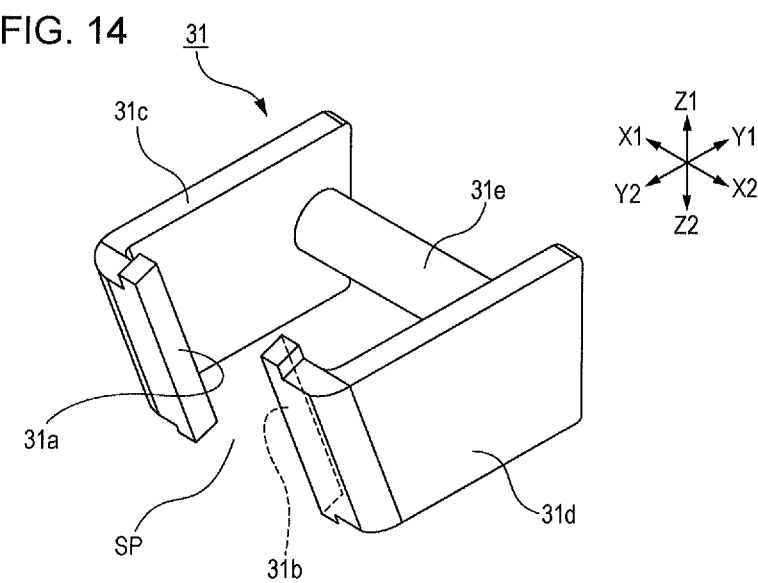
FIG. 14 is a perspective view illustrating the outside shape of a magnetic member in the third embodiment.
Figure 16A:
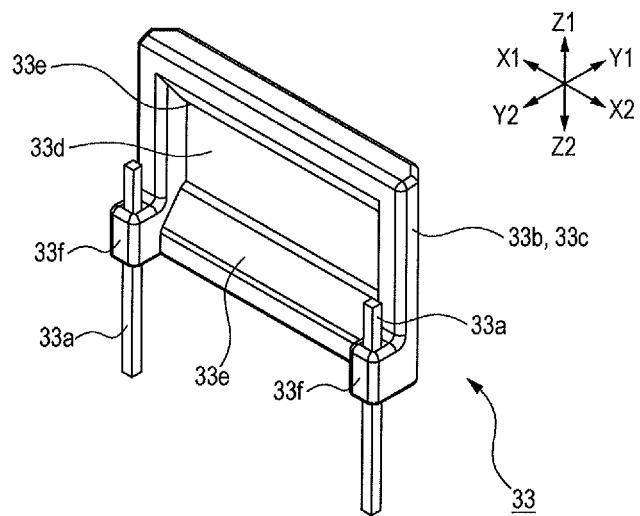
FIGS. 16A and 16B are drawings illustrating a terminal in the third embodiment, FIG. 16A being a perspective view illustrating the outside shape of the terminal, FIG. 16B being a cross-sectional view taken at a point between two holding parts along a plane including the Y1-Y2 direction and Z1-Z2 direction indicated in FIG. 16A.
Figure 16B:
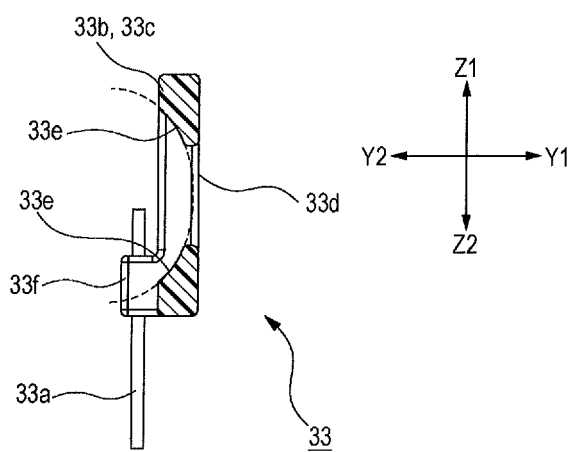
Figure 17:
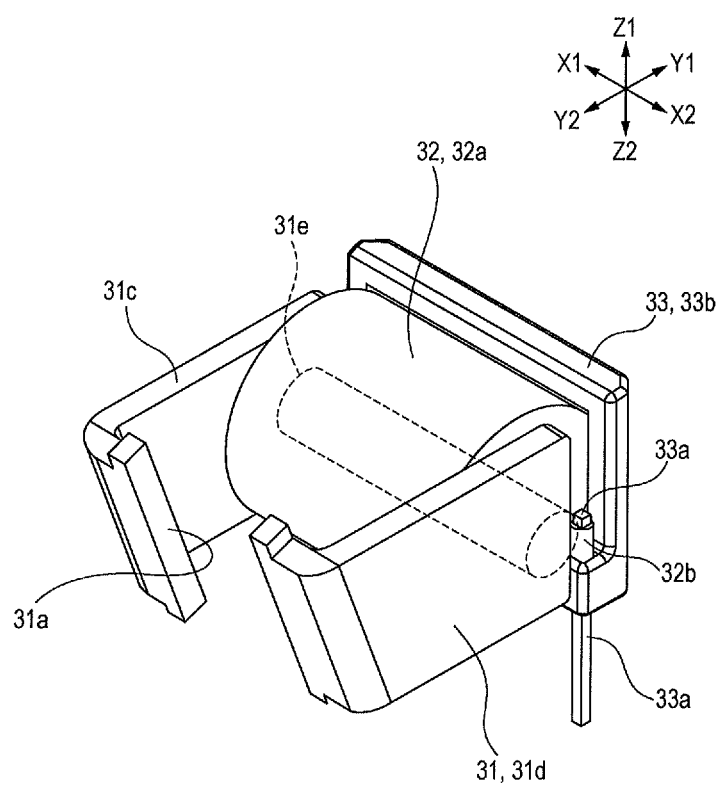
FIG. 17 is a perspective view illustrating the magnetic member, a coil, and the terminal in the third embodiment in a state in which they are combined together.
Figure 18:
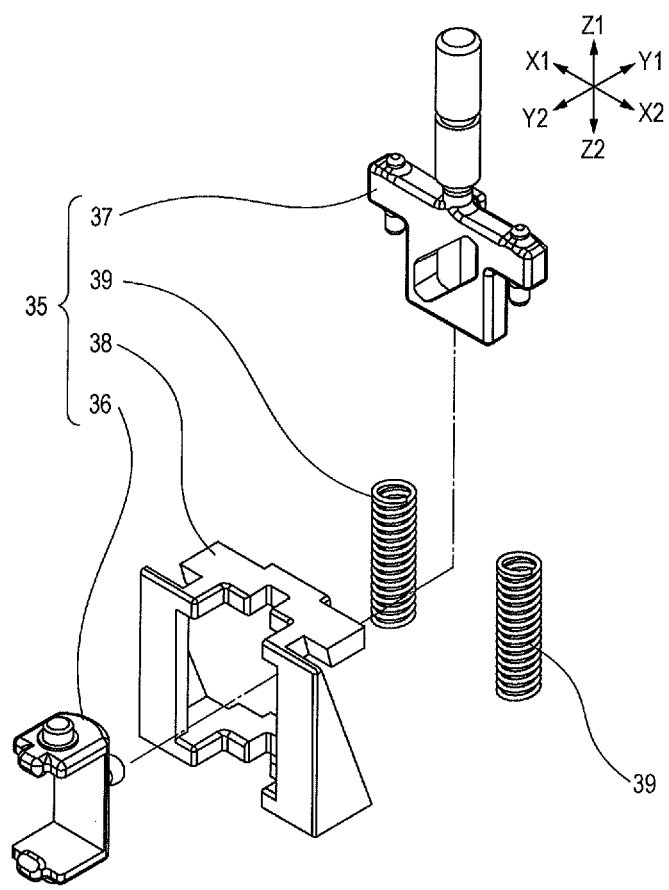
FIG. 18 is an exploded perspective view illustrating the structure of a manipulation member in the third embodiment.
Figure 19A:
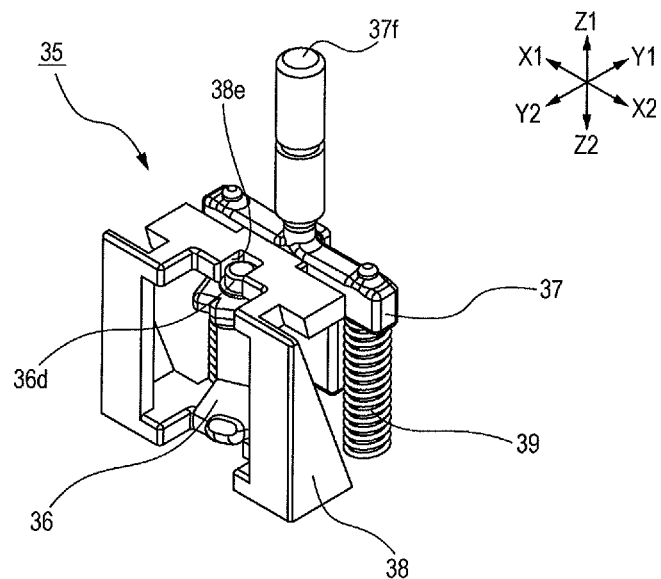
FIGS. 19A and 19B are drawings illustrating the manipulation member in the third embodiment, FIG. 19A being a perspective view illustrating the outside shape of the manipulation member, FIG. 19B being a side view illustrating the outside shape of the manipulation member in a state viewed from the side in the Y1 direction indicated in FIG. 19A.
Figure 19B:
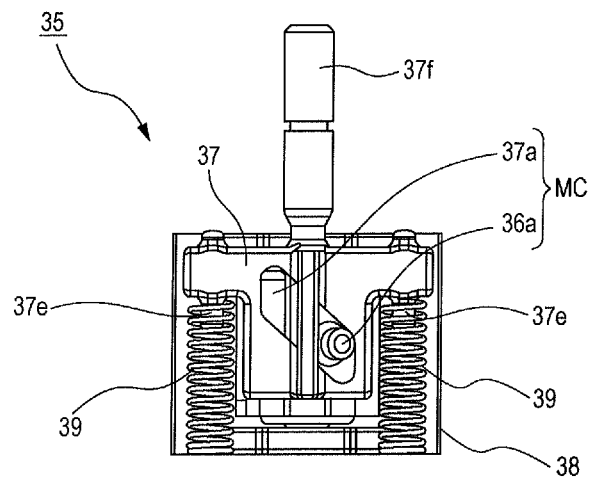
Figure 21A:
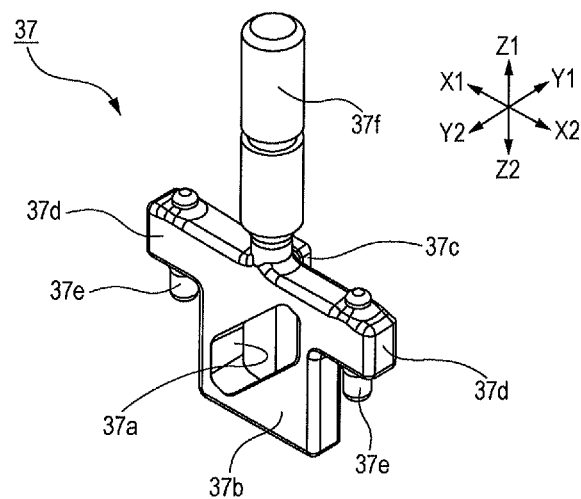
FIGS. 21A and 21B are drawings illustrating a sliding member in the third embodiment, FIG. 21A being a perspective view illustrating the outside shape of the sliding member, FIG. 21B being a perspective view illustrating the sliding member in a state viewed from the side in the Y1 direction indicated in FIG. 21A.
Figure 21B:
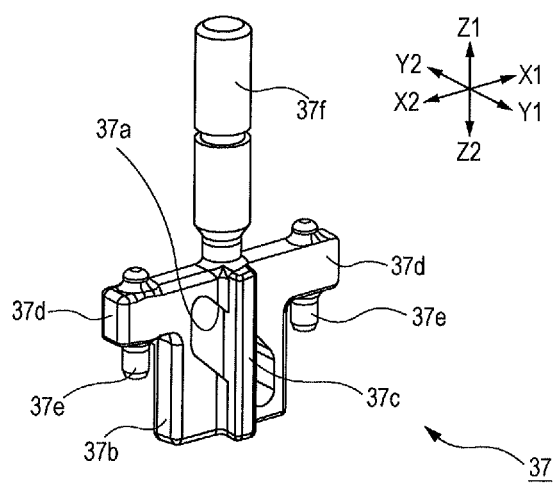
Figure 22A:
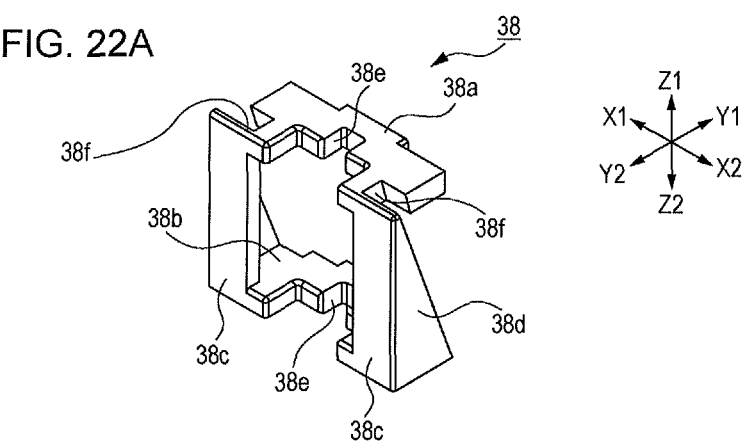
FIGS. 22A to 22C are drawings illustrating a joint member in the third embodiment, FIG. 22A being a perspective view illustrating the outside shape of the joint member, FIG. 22B being a side view illustrating the joint member in a state viewed from the side in the X2 direction indicated in FIG. 22A, FIG. 22C being a plan view illustrating the joint member in a state viewed from the side in the Z1 direction indicated in FIG. 22A.
Figure 22B:
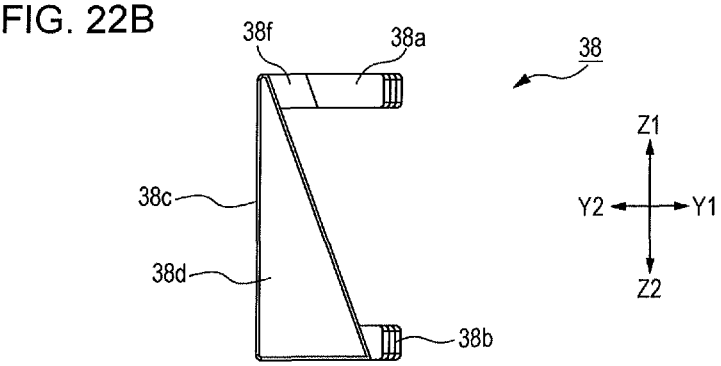
Figure 22C:
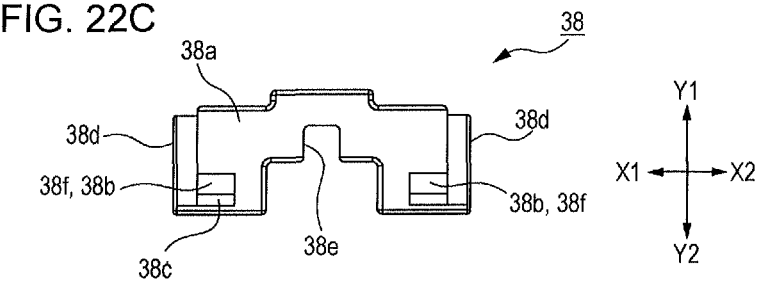
Figure 23A:
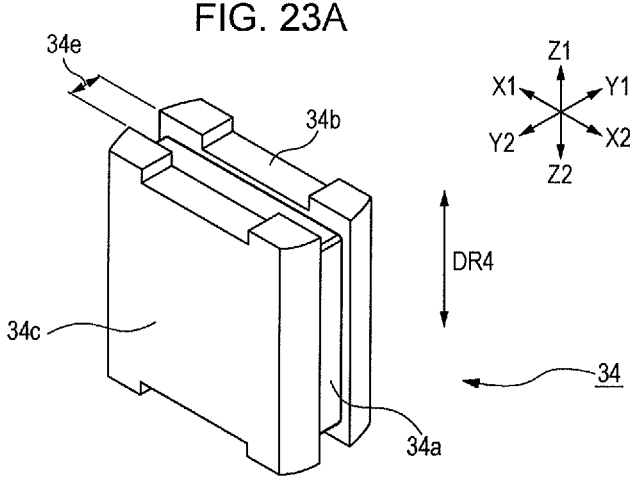
FIGS. 23A and 23B are drawings illustrating a rotational magnet body in the third embodiment, FIG. 23A being a perspective view illustrating the outside shape of the rotational magnet body, FIG. 23B being a side view illustrating the rotational magnet body in a state viewed from the side in the X2 direction indicated in FIG. 23A.
Figure 23B:
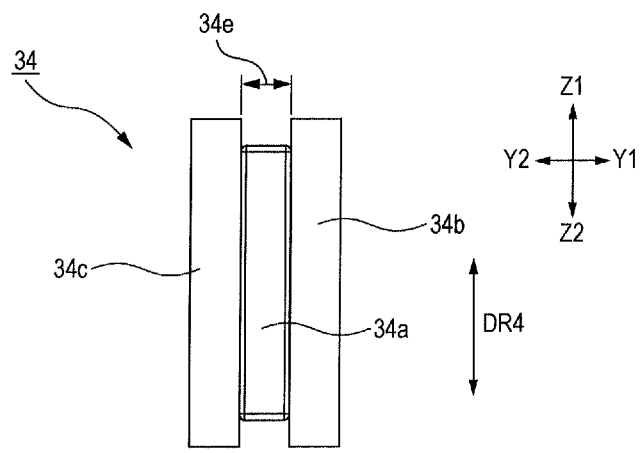
Figure 24A:
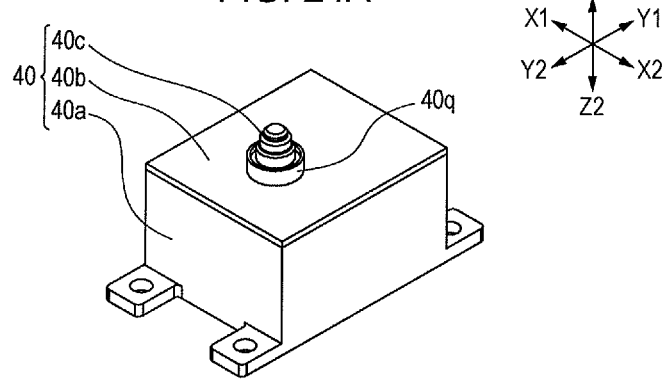
FIGS. 24A and 24B are drawings illustrating a case in the third embodiment, FIG. 24A being a perspective view illustrating the outside shape of the case, FIG. 24B being an exploded perspective view illustrating the structure of the case.
Figure 24B:
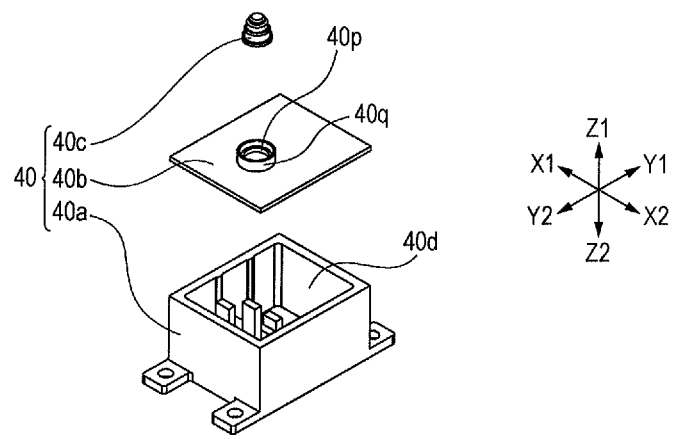
Figure 25A:
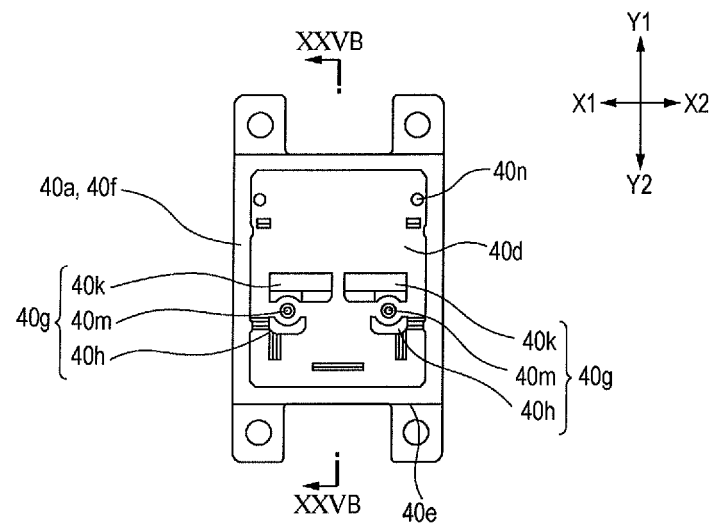
FIGS. 25A and 25B are drawings illustrating a lower case in the third embodiment, FIG. 25A being a plan view illustrating the case in a state viewed from the side in the Z1 direction indicated in FIG. 24B, FIG. 25B being a perspective cross-sectional view taken along line XXVB-XXVB in FIG. 25A.
Figure 25B:
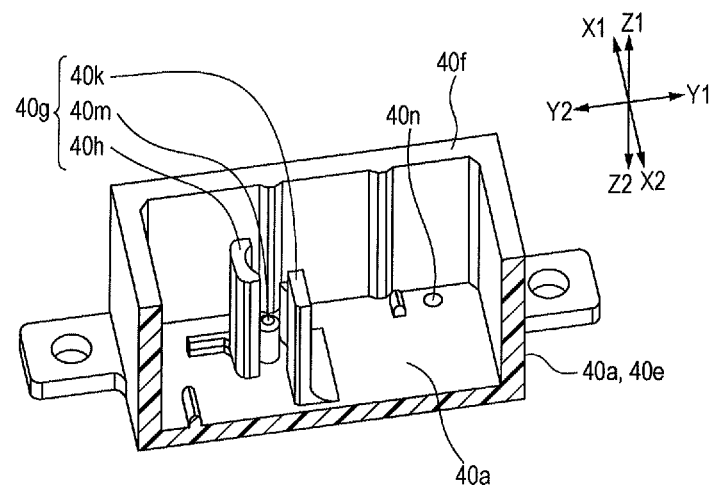

A power generation input device 300 in a third embodiment will be described below with reference to FIG. 12 to FIGS. 25A to 25B. FIG. 12 is an exploded perspective view illustrating the structure of the power generation input device 300 in the third embodiment. FIG. 13 is a perspective view illustrating the outside shape of the power generation input device 300 in the third embodiment. FIG. 14 is a perspective view illustrating the outside shape of a magnetic member 31 in the third embodiment. FIGS. 15A and 15B are drawings illustrating the magnetic member 31 in the third embodiment; FIG. 15A is a side view illustrating the magnetic member 31 when viewed from the side in the X2 direction indicated in FIG. 14, and FIG. 15B is a side view illustrating the magnetic member 31 when viewed from the side in the Z1 direction indicated in FIG. 14. FIGS. 16A and 16B are drawings illustrating a terminal 33 in the third embodiment; FIG. 16A is a perspective view illustrating the outside shape of the terminal 33, and FIG. 16B is a cross-sectional view taken at a point between two holding parts 33f along a plane including the Y1-Y2 direction and Z1-Z2 direction indicated in FIG. 16A. FIG. 17 is a perspective view illustrating the magnetic member 31, a coil 32, and the terminal 33 in the third embodiment in a state in which they are combined together. FIG. 18 is an exploded perspective view illustrating the structure of a manipulation member 35 in the third embodiment. FIGS. 19A and 19B are drawings illustrating the manipulation member 35 in the third embodiment; FIG. 19A is a perspective view illustrating the outside shape of the manipulation member 35, and FIG. 19B is a side view illustrating the outside shape of the manipulation member 35 in a state viewed from the side in the Y1 direction indicated in FIG. 19A. FIGS. 20A and 20B are drawings illustrating a rotating body 36 in the third embodiment; FIG. 20A is a perspective view illustrating the outside shape of the rotating body 36, and FIG. 20B is a side view illustrating the rotating body 36 in a state viewed from the side in the X2 direction indicated in FIG. 20A. FIGS. 21A and 21B are drawings illustrating a sliding member 37 in the third embodiment; FIG. 21A is a perspective view illustrating the outside shape of the sliding member 37, and FIG. 21B is a perspective view illustrating the sliding member 37 in a state viewed from the side in the Y1 direction indicated in FIG. 21A. FIGS. 22A to 22C are drawings illustrating a joint member 38 in the third embodiment; FIG. 22A is a perspective view illustrating the outside shape of the joint member 38, FIG. 22B is a side view illustrating the joint member 38 in a state viewed from the side in the X2 direction indicated in FIG. 22A, and FIG. 22C is a plan view illustrating the joint member 38 in a state viewed from the side in the Z1 direction indicated in FIG. 22A. FIGS. 23A and 23B are drawings illustrating a rotational magnet body 34 in the third embodiment; FIG. 23A is a perspective view illustrating the outside shape of the rotational magnet body 34, and FIG. 23B is a side view illustrating the rotational magnet body 34 in a state viewed from the side in the X2 direction indicated in FIG. 23A. FIGS. 24A and 24B are drawings illustrating a case 40 in the third embodiment; FIG. 24A is a perspective view illustrating the outside shape of the case 40, and FIG. 24B is an exploded perspective view illustrating the structure of the case 40. FIGS. 25A and 25B are drawings illustrating a lower case 40a in the third embodiment; FIG. 25A is a plan view illustrating the lower case 40a in a state viewed from the side in the Z1 direction indicated in FIG. 24B, and FIG. 25B is a perspective cross-sectional view taken along line XXVB-XXVB in FIG. 25A.

The power generation input device 300 includes the magnetic member 31, coil 32, terminal 33, rotational magnet body 34, manipulation member 35, and case 40 as illustrated in FIG. 12. The manipulation member 35 includes the rotating body 36, the sliding member 37, the joint member 38, and urging members 39. When part of the sliding member 37, which is disposed so as to protrude toward the outside as illustrated in FIG. 13, of the manipulation member 35 is pressed, an input manipulation is performed on the power generation input device 300. The power generation input device 300 can generate electric power by itself due to operations of its constituent components involved in the input manipulation.

The magnetic member 31, which is made of a magnetic material, includes a first magnetic member 31c, a second magnetic member 31d, and a linking axis 31e as illustrated in FIG. 12. The first magnetic member 31c, second magnetic member 31d, and linking axis 31e are combined together so that both ends of the linking axis 31e formed in a columnar shape are sandwiched by the first magnetic member 31c and second magnetic member 31d formed in a plate-like shape, as illustrated in FIG. 14. The linking axis 31e is linked to the first magnetic member 31c at a position near its center point in the up-and-down direction (Z1-Z2 direction) on one end side in the Y1 direction, and is linked to the second magnetic member 31d at a position near its center point in the up-and-down direction (Z1-Z2 direction) at one end in the Y1 direction. The tops of the first magnetic member 31c and second magnetic member 31d at the other end in the Y2 direction are bent so as to face each other with a space SP left between them. A first facing part 31a is formed in a smooth-surface-like shape at the top of the other end of the first magnetic member 31c. A second facing part 31b is formed in a smooth-surface-like shape at the top of the other end of the second magnetic member 31d. The first facing part 31a and second facing part 31b are formed so as to be in parallel to each other and to extend along a first direction DR3 illustrated in FIGS. 15A and 15B. The first direction DR3 is orthogonal to the X1-X2 direction and is inclined with respect to the Y1-Y2 direction and Z1-Z2 direction.

The terminal 33 includes two terminal parts 33a, which are made of a metal rod, and a holder 33b, which is made of a synthetic resin, as illustrated in FIGS. 16A and 16B. Each terminal part 33a is formed in a rod-like shape having a rectangular cross-section. The holder 33b has a base 33c formed in a rectangular-plate-like shape in a plan view. The base 33c has a window 33d, which extends through the base 33c in its thickness direction (Y1-Y2 direction). The base 33c also has inclined surfaces 33e, which are inclined toward the window 33d, at the upper side (on the side in the Z1 direction) of one side (on the side Y2 direction) of the window 33d in the thickness direction and at the lower side (on the side in the Z2 direction). Each inclined surface 33e is formed in a curved-surface-like shape that matches the outer circumferential surface of a column. On the side on which the inclined surfaces 33e of the base 33c are formed, the holder 33b has holding parts 33f, which protrude toward the one side in the thickness direction, at both ends of the base 33c in its longitudinal direction (X1-X2 direction). Each terminal part 33a is integrally held by its relevant holding part 33f and protrudes upwardly and downwardly from the holding part 33f.

The coil 32, which is conductive, is made of a metal wire coated in an insulated manner except both ends. As illustrated in FIG. 12, the coil 32 is formed in a cylindrical shape in which the metal wire is wound along the outer circumference of a column. In the third embodiment, the coil 32 has a wound part 32a formed by winding the metal wire along the outer circumference of the linking axis 31e of the magnetic member 31, except ends 32b, which are ends on both sides of the metal wire, as illustrated in FIG. 17, and is held by the linking axis 31e. Each of the ends 32b on both sides of the metal wire is wound around the relevant terminal part 33a of the terminal 33 at a portion protruding upwardly (on the side in the Z1 direction) above the holding part 33f, after which the end 32b is secured by soldering. Thus, the terminal 33 and coil 32 are electrically interconnected. When the coil 32 is held by the magnetic member 31 and terminal 33 and is secured, the coil 32 is disposed so that part of the outer circumference of the wound part 32a follows the inclined surface 33e (see FIGS. 16A and 16B).

As illustrated in FIG. 18 and FIGS. 19A and 19B, the manipulation member 35 includes the rotating body 36, sliding member 37, joint member 38, and urging members 39.

As illustrated in FIG. 18, each urging member 39 is a coil spring formed in a cylindrical shape.

The rotating body 36 is made of a synthetic resin. As illustrated in FIGS. 20A and 20B, the rotating body 36 has a basic part 36b, which is formed in a plate-like shape and is erected, and a pair of holding parts 36c formed in a plate-like shape, one of which extends from the upper end (end in the Z1 direction) of the basic part 36b in a direction (Y2 direction) orthogonal to the basic part 36b, and the other of which similarly extends from the lower end (end in the Z2 direction). The rotating body 36 also has an engaging part 36a at the midpoint of the basic part 36b in the up-and-down direction, the engaging part 36a extending in a direction (Y1 direction) opposite to the direction in which the holding parts 36c extend. The top of the engaging part 36a in the direction in which it extends is formed in a spherical shape. The rotating body 36 also has a pair of rotational axes 36d formed in a columnar shape, one of which extends upwardly from the center position of the upper surface of the holding part 36c disposed at the upper end of the basic part 36b, and the other of which extends downwardly from the center position of the lower surface of the holding part 36c disposed at the lower end of the basic part 36b. The rotational axes 36d disposed at the upper and lower ends of the basic part 36b are formed so as to be aligned with the same straight line (axis SF).

The sliding member 37, which is made of a synthetic resin, has a sliding part 37b formed in a rectangular-plate-like shape as illustrated in FIGS. 21A and 21B. The sliding part 37b is formed so that its erected plate surfaces face lateral direction (Y1 and Y2 directions), and has a cam 37a, which extends through the sliding part 37b in its thickness direction (Y1-Y2 direction). In the third embodiment, the cam 37a extends so as to follow a diagonal line that connects a corner in the X1 direction and Z2 direction and a corner in the X2 direction and Z1 direction when one plate surface (surface on the side in the Y2 direction) of the sliding part 37b is viewed in a front view. On the other plate surface (on the side in the Y1 direction) of the sliding part 37b, a guide rib 37c is formed so as to protrude in a rib-like shape in the Y1 direction. The guide rib 37c extends from the upper end of the sliding part 37b to its lower end at the midpoint of the sliding part 37b in its width direction (X1-X2 direction) so as to bridge the cam 37a. The sliding member 37 also has extending parts 37d, which extend in the width direction of the sliding part 37b from both ends in the width direction. On each extending part 37d, an urgent member holding part 37e is formed in a columnar shape so as to protrude downwardly. The size of the urgent member holding part 37e is such that it can be inserted into the urging member 39 from its end. The sliding member 37 also has a manipulating part 37f formed in a columnar shape so as to protrude upwardly from the center position on the upper end of the sliding part 37b in its width direction.

As illustrated in FIGS. 22A to 22C, the joint member 38, which is made of a synthetic resin, has an upper support plate 38a formed in a flat-plate-like shape, a lower support plate 38b formed below the upper support plate 38a in a flat-plate-like shape so as to be in parallel to the upper support plate 38a, linking walls 38c, each of which is formed so as to mutually link one end (in the Y2 direction) of the upper support plate 38a and one end (on the side in the Y2 direction) of the lower support plate 38b, and guide walls 38d, which extend from both ends of the linking walls 38c above the upper surface of the lower support plate 38b. The upper support plate 38a and lower support plate 38b are shaped so as to have a cutout near the center in their width direction (X1-X2 direction) on one end side. At the inside of the cutout, an axis holding part 38e, which is a further cutout, is formed. The size of the axis holding part 38e is such that the rotational axis 36d of the rotating body 36 can be inserted into the axis holding part 38e. The positions of the axis holding parts 38e formed in the upper support plate 38a and lower support plate 38b are matched when viewed from above (on the side in the Z1 direction). At both ends of the upper support plate 38a that are linked to the linking walls 38c, magnetic member guide grooves 38f, which shaped so as to have a cutout, are formed. If the X1-X2 direction, Y1-Y2 direction, and Z1-Z2 direction in FIGS. 22A to 22C respectively match the X1-X2 direction, Y1-Y2 direction, and Z1-Z2 direction in FIGS. 15A and 15B, each magnetic member guide groove 38f follows the first direction DR3. The guide wall 38d is formed in a right-angled triangle shape in a plan view taken on the side in the X2 direction. A portion equivalent to the hypotenuse of the right-angled triangle is formed so as to follow the first direction DR3 and to be contiguous to the magnetic member guide groove 38f. The linking walls 38c are separated from each other in their width direction.

The rotating body 36, sliding member 37, joint member 38, and urging members 39 formed as described above form the manipulation member 35. As illustrated in FIGS. 19A and 19b, the two urging members 39 are held by the sliding member 37 in a state in which each urgent member holding part 37e of the sliding member 37 is inserted into one end of the relevant urging member 39. The rotating body 36 is disposed in a state in which the rotational axes 36d at the upper and lower ends of the basic part 36b are respectively inserted into the axis holding parts 38e formed in the upper and lower portions of the joint member 38. The rotating body 36 is disposed so as to be rotatable around the rotational axis 36d (axis SF illustrated in FIGS. 20A and 20B), which functions as the rotational axis. At the same time, the rotating body 36 is disposed so that the engaging part 36a protrudes toward a side opposite to a side on which the linking walls 38c of the joint member 38 are disposed. The sliding member 37 holding the urging members 39 is disposed next to the joint member 38 in a state in which the manipulating part 37f protrudes upwardly and the engaging part 36a is inserted into the cam 37a. The manipulation member 35 is formed in this way. The manipulation member 35 is formed so that the sliding member 37 is movable in the up-and-down direction. When the sliding member 37 moves in the up-and-down direction, the engaging part 36a moves along the cam 37a. Due to the movement of the engaging part 36a, the rotating body 36 rotates around the rotational axis 36d. Thus, the manipulation member 35 has a conversion mechanism MC that is formed by using the cam 37a and the engaging part 36a guided by the cam 37a.

As illustrated in FIGS. 23A and 23B, the rotational magnet body 34 has a magnet 34a, a first magnetizing member 34b placed on the same side as one magnetic pole of the magnet 34a, and a second magnetizing member 34c placed on the same side as the other magnetic pole of the magnet 34a. The magnet 34a, which is formed in a plate-like shape, is magnetized in its thickness direction (Y1-Y2 direction). In the third embodiment, the magnet 34a has been magnetized to have an S pole at one side (the side in the Y1 direction) and an N pole at the other side (the side in the Y2 direction). The first magnetizing member 34b and second magnetizing member 34c, which are made of a magnetic substance, are formed in a flat-plate-like shape. The first magnetizing member 34b and second magnetizing member 34c sandwich the magnet 34a, forming the rotational magnet body 34. The first magnetizing member 34b is placed on the same side as the S pole of the magnet 34a, and the second magnetizing member 34c is placed on the same side as the N pole of the magnet 34a. In this placement, the first magnetizing member 34b is magnetized to the S pole, and the second magnetizing member 34c is magnetized to the N pole. Gaps 34e are formed between the first magnetizing member 34b and the second magnetizing member 34c. When a side of the rotational magnet body 34 in the X1 or X2 direction is viewed, direction in which each gap 34e extends will now be referred to as a second direction DR4. In the third embodiment, the second direction DR4 matches the up-and-down direction (Z1-Z2 direction).

As illustrated in FIGS. 24A and 24B, the case 40 includes a lower case 40a and an upper case 40b, which are made of a synthetic resin, as well as a cover member 40c made of a synthetic rubber. The lower case 40a is formed in a rectangular parallelepiped shape; its interior is hollow and its upper portion (on the side in the Z1 direction) is open. In the lower case 40a, an accommodating part 40d is formed in which other constituent components can be accommodated. The side walls of the lower case 40a, which define the accommodating part 40d, are formed so as to form a rectangle when the lower case 40a is viewed from above. Now, the side walls including the shorter edges of the rectangle formed by the side walls that define the accommodating part 40d will be referred to first side walls 40e, and the side walls including the longer edges will be referred to second side walls 40f. As illustrated in FIGS. 25A and 25B, slide guides 40g are provided in the interior of the accommodating part 40d so as to protrude upwardly from the bottom of the interior. Each slide guide 40g includes a first guide wall 40h, a second guide wall 40k, and an urging member holding pin 40m. The first guide wall 40h is formed in a wall-like shape having a wall that faces the first side walls 40e. The first guide wall 40h is positioned at a distance from one first side wall 40e (on the side in the Y2 direction) toward the other first side wall 40e (on the side in the Y1 direction) so that the joint member 38 can be placed. The first guide wall 40h is positioned at a distance equal to the thickness of the first magnetic member 31c of the magnetic member 31 from one second side wall 40f and at a distance equal to the thickness of the second magnetic member 31d of the magnetic member 31 from the other second side wall 40f. The two first guide walls 40h are separated from each other; one is on the same side as one second side wall 40f, and the other is on the same side as the other second side wall 40f. The second guide wall 40k is formed in a wall-like shape having a wall that faces the first side walls 40e. The first guide wall 40h is positioned at a distance from the first guide wall 40h toward the other first side wall 40e so that the sliding member 37 and urging member 39 can be placed. The second guide wall 40k is positioned at a distance equal to the thickness of the first magnetic member 31c of the magnetic member 31 from one second side wall 40f and at a distance equal to the thickness of the second magnetic member 31d of the magnetic member 31 from the other second side wall 40f. The two second guide walls 40k are separated from each other so that the guide rib 37c of the sliding member 37 can be placed between them; one is on the same side as one second side wall 40f, and the other is on the same side as the other second side wall 40f. The urging member holding pin 40m is formed in a columnar shape, the size of which is such that it can be inserted into the urging member 39. One of the two urging member holding pins 40m is disposed between the first guide wall 40h and second guide wall 40k disposed on the same side as one second side wall 40f. Similarly, the other urging member holding pin 40m is disposed between the first guide wall 40h and second guide wall 40k disposed on the same side as the other second side wall 40f. The two urging member holding pins 40m are spaced at the same interval as the two urgent member holding parts 37e of the sliding member 37. Portions, of the first guide wall 40h and second guide wall 40k, that face the urging member holding pin 40m are formed in a concave shape so that the urging member 39 can be placed. Two terminal-use through-holes 40n, which extend in the up-and-down direction, are formed in the bottom of the interior of the accommodating part 40d on the same side as the other first side wall 40e (on the side in the Y1 direction). The size of the terminal-use through-hole 40n is such that the terminal part 33a can pass through the terminal-use through-hole 40n. The terminal-use through-holes 40n are aligned with the first side wall 40e; one of them is on the same side as one second side wall 40f and the other is on the same side as the other second side wall 40f. The two terminal-use through-holes 40n are spaced at the same interval as the two terminal parts 33a of the terminal 33. The upper case 40b is formed like a rectangular-flat-plate-like shape, the size of which is such that it can cover the upper portion of the accommodating part 40d in the lower case 40a, as illustrated in FIGS. 24A and 24B. The upper case 40b has a manipulating-part-use through-hole 40p, which extends through the upper case 40b in its thickness direction (Z1-Z2 direction). A collar 40q is formed around an opening on one side (on the side in the Z1 direction) of the manipulating-part-use through-hole 40p, the collar 40q being shaped like a wall that encloses the opening. The size of the manipulating-part-use through-hole 40p is such that the manipulating part 37f of the sliding member 37 can pass through the manipulating-part-use through-hole 40p. The cover member 40c has a hollow shape obtained by, for example, cutting the top of a cone; the upper side (on the side in the Z1 direction) and lower side (on the side in the Z2 direction) of the cone are open. The size of the lower side of the cone of the cover member 40c is such that the cone can be placed in the interior of the collar 40q of the upper case 40b. The cover member 40c is elastic, so it can be deformed according to an external force. The opening on the upper side of the cone of the cover member 40c has a smaller diameter than the manipulating part 37f, formed in a columnar shape, of the sliding member 37. When the upper case 40b is lodged on the lower case 40a so as to cover its upper portion and the cover member 40c engages the interior of the collar 40q on the upper case 40b, the case 40 illustrated in FIGS. 24A and 24B is formed.

Figure 26A:
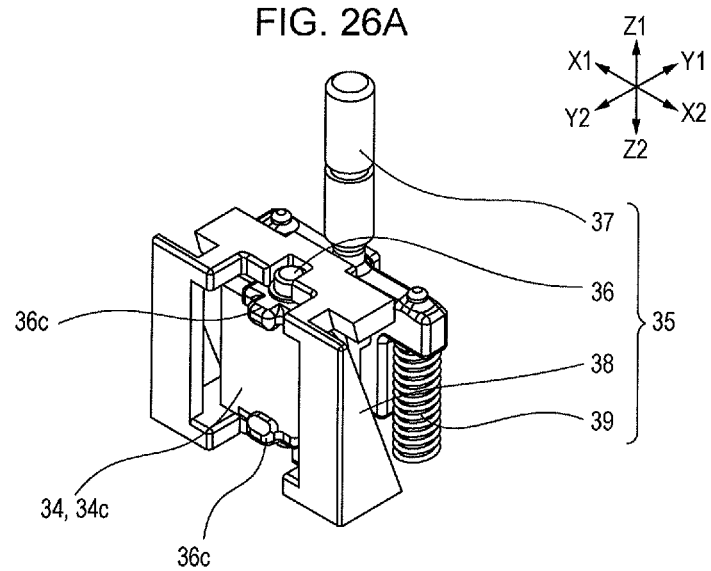
FIGS. 26A and 26B are drawings illustrating the manipulation member into which the rotational magnet body in the third embodiment has been incorporated, FIG. 26A being a perspective view illustrating the outside shape of the manipulation member into which the rotational magnet body has been incorporated, FIG. 26B being a side view illustrating the manipulation member into which the rotational magnet body has been incorporated in a state viewed from the side in the X2 direction indicated in FIG. 26A.
Figure 26B:
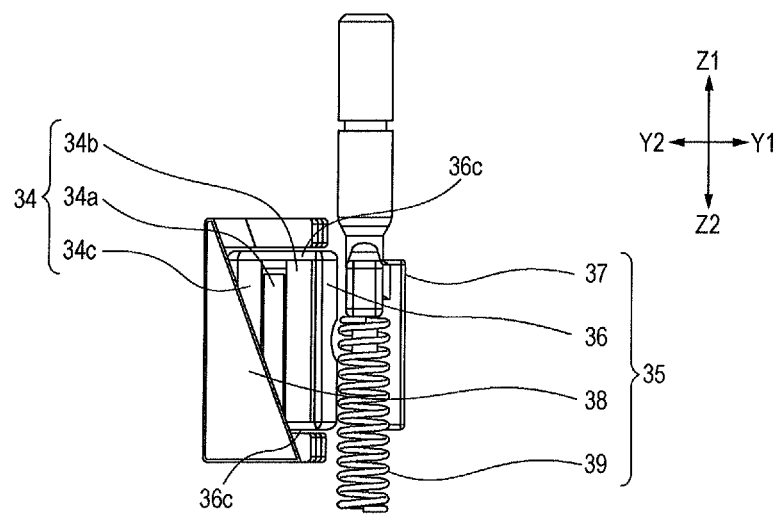
Figure 27A:
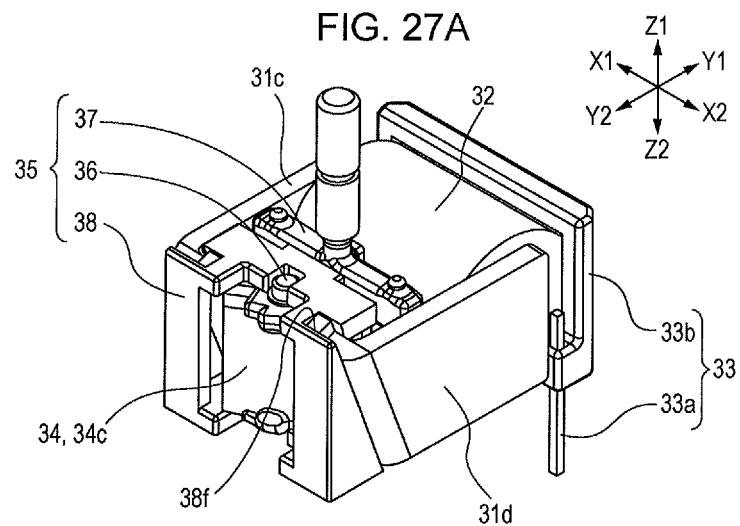
FIGS. 27A and 27B are drawings illustrating the magnetic member, coil, terminal, rotational magnet body, and manipulation member have been integrally assembled in the third embodiment, FIG. 27A being a perspective view illustrating the outside shape of the magnetic member, coil, terminal, rotational magnet body, and manipulation member that have been integrally assembled, FIG. 27B being a side view illustrating the magnetic member, coil, terminal, rotational magnet body, and manipulation member that have been integrally assembled in a state viewed from the side in the X2 direction indicated in FIG. 27A.
Figure 27B:
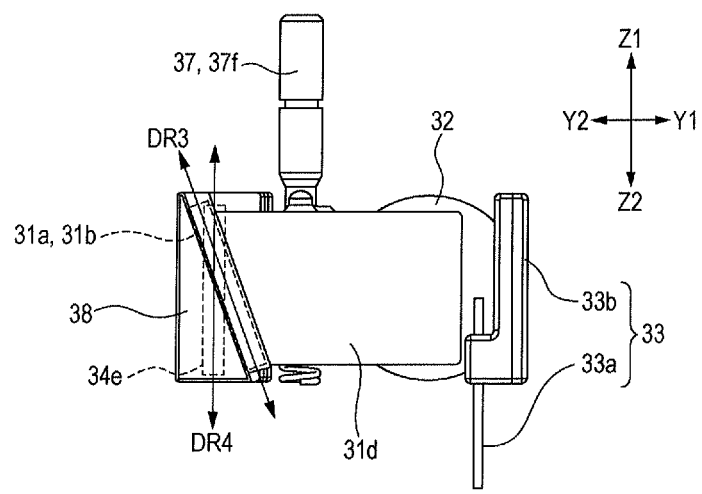
Figure 28A:
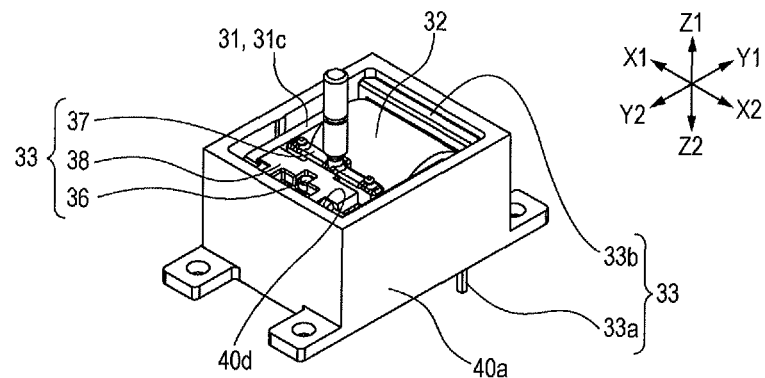
FIGS. 28A and 28B are drawings illustrating the lower case of the case in the third embodiment in a state in which other constituent components are included in the lower case, FIG. 28A being a perspective view illustrating the outside shape of the lower case in which other constituent components are included, FIG. 28B being a plan view illustrating the lower case in which other constituent components are included in a state viewed from the side in the Z1 direction indicated in FIG. 28A.
Figure 28B:
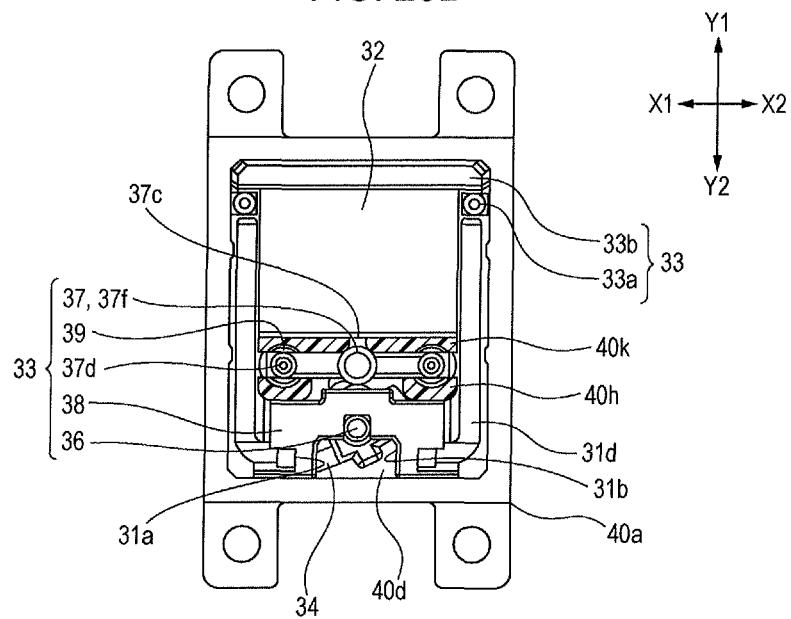
Figure 33:
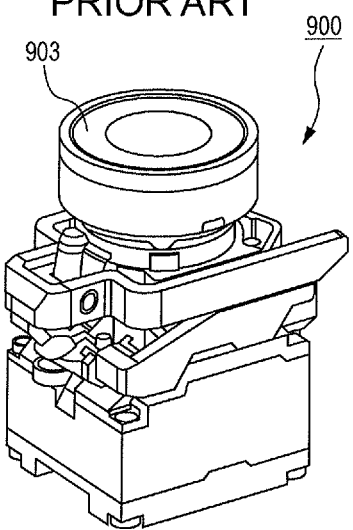
FIG. 33 is a perspective view illustrating the outside shape of a power generation input device described in Japanese Unexamined Patent Application Publication No. 2012-164658.
Figure 34:
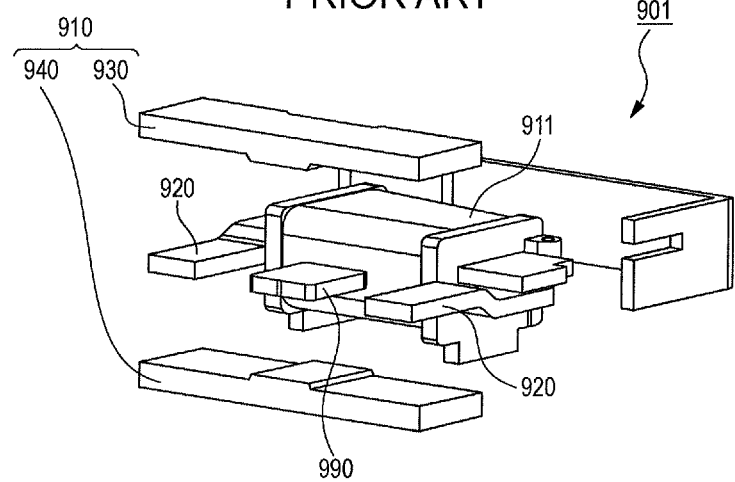
FIG. 34 is an exploded perspective view illustrating the structure of a power generator incorporated into the power generation input device described in Japanese Unexamined Patent Application Publication No. 2012-164658.
Figure 35A:
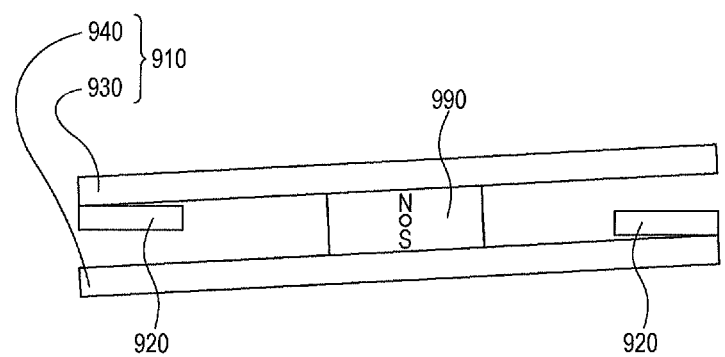
FIGS. 35A and 35B are drawings illustrating the seesaw motion of a moving part described in Japanese Unexamined Patent Application Publication No. 2012-164658.
Figure 35B:
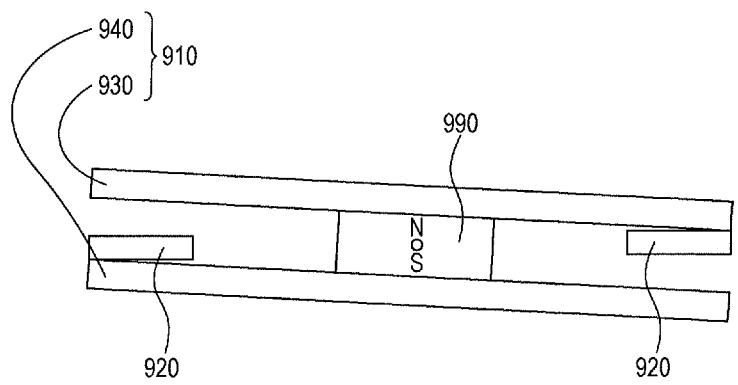

Next, the structure of the power generation input device 300 will be described with reference to FIG. 13 and FIGS. 26A and 26B to FIGS. 28A and 28B. FIGS. 26A and 26B are drawings illustrating the manipulation member 35 into which the rotational magnet body 34 in the third embodiment has been incorporated; FIG. 26A is a perspective view illustrating the outside shape of the manipulation member 35 into which the rotational magnet body 34 has been incorporated, and FIG. 26B is a side view illustrating the manipulation member 35 into which the rotational magnet body 34 has been incorporated in a state viewed from the X2 direction indicated in FIG. 26A. FIGS. 27A and 27B are drawings illustrating the magnetic member 31, coil 32, terminal 33, rotational magnet body 34, and manipulation member 35 have been integrally assembled in the third embodiment; FIG. 27A is a perspective view illustrating the outside shape of the magnetic member 31, coil 32, terminal 33, rotational magnet body 34, and manipulation member 35 that have been integrally assembled, and FIG. 27B is a side view illustrating the magnetic member 31, coil 32, terminal 33, rotational magnet body 34, and manipulation member 35 that have been integrally assembled in a state viewed from the X2 direction indicated in FIG. 27A. FIGS. 28A and 28B are drawings illustrating the lower case 40a of the case 40 in the third embodiment in a state in which other constituent components are included in the lower case 40a; FIG. 28A is a perspective view illustrating the outside shape of the lower case 40a in which other constituent components are included, and FIG. 28B is a plan view illustrating the lower case 40a in which other constituent components are included in a state viewed from the Z1 direction indicated in FIG. 28A.

The upper side and lower side (on the Z1-Z2 direction) of the rotational magnet body 34 are held by the holding parts 36c of the rotating body 36 so as to be combined with the manipulation member 35, as illustrated FIGS. 26A and 26B. In this case, in the third embodiment, the first magnetizing member 34b is placed on the same side as the sliding member 37 (on the side in the Y1 direction), and, the second magnetizing member 34c is placed on a portion of the first magnetizing member 34b, the portion being on the side in the Y2 direction on which the sliding member 37 is not placed, with the magnet 34a intervening between the first magnetizing member 34b and the second magnetizing member 34c. Therefore, the second direction DR4 (see FIGS. 23A and 23B) is preferably a direction along the axis SF (see FIGS. 20A and 20B).

The manipulation member 35 holding the rotational magnet body 34 is placed in a space enclosed by the coil 32 and the first magnetic member 31c and second magnetic member 31d of the magnetic member 31, which is formed integrally with the coil 32 and terminal 33, as illustrated in FIG. 27A. In this case, the manipulation member 35 is placed so that the tops of the first magnetic member 31c and second magnetic member 31d are inserted along their respective magnetic member guide grooves 38f formed in the joint member 38. In this placement, the rotational magnet body 34 is positioned between the first facing part 31a and second facing part 31b, and one of the gaps 34e defined by the first magnetizing member 34b and second magnetizing member 34c faces he first facing part 31a and the other faces the second facing part 31b. In this placement, the first direction DR3, in which the first facing part 31a and second facing part 31b extend, crosses the second direction DR4, in which the gaps 34e (see FIGS. 23A and 23B) extend. Therefore, at least the first facing part 31a and second facing part 31b preferably extend in a direction inclined with respect to the axis SF.

The manipulation member 35 formed integrally with the rotational magnet body 34 and the magnetic member 31 formed integrally with the coil 32 and terminal 33 are placed in the interior of the accommodating part 40d in the lower case 40a so that the manipulating part 37f of the manipulation member 35 protrudes upwardly (Z1 direction), as illustrated in FIGS. 28A and 28B. Each terminal part 33a of the terminal 33 is placed so as to pass through its relevant terminal-use through-hole 40n (see FIGS. 25A and 25B) and to protrude downwardly (Z2 direction) from the bottom surface of the lower case 40a. Each urging member 39 is sandwiched between the extending part 37d of the sliding member 37 and the bottom surface of the interior of the accommodating part 40d in the lower case 40a in a state in which the urging member holding pin 40m (see FIGS. 25A and 25B) is inserted into one end of the urging member 39. The sliding member 37 is placed between the first guide walls 40h and the second guide walls 40k so as to be movable in the up-and-down direction against an urging force generated by the urging members 39. The guide rib 37c of the sliding member 37 is placed between the second guide walls 40k, Which are separately disposed.

As illustrated in FIG. 13, the upper case 40b is placed so as to cover the upper portion of the accommodating part 40d (see FIG. 24B) of the lower case 40a in a state in which the manipulating part 37f of the manipulation member 35 is passed through the manipulating-part-use through-hole 40p (see FIG. 24B), and is integrally lodged on the lower case 40a. The cover member 40c is placed in the interior of the collar 40q on the upper case 40b in a state in which the manipulating part 37f of the manipulation member 35 is passed through the manipulating-part-use through-hole 40p, and is integrally lodged on the upper case 40b. Although the opening on the upper side of the cover member 40c has a smaller diameter than the manipulating part 37f, since the cover member 40c is elastic, the manipulating part 37f can be passed through the opening. Furthermore, due to a force with which the cover member 40c is contracted and expanded, it is locked at part of the manipulating part 37f. When the case 40 is formed in this way, the power generation input device 300 is formed. Upon the forming of the case 40, the upper case 40b presses the sliding member 37 downwardly, the urging members 39 are compressed and held in the accommodating part 40d, and the sliding member 37 is urged upwardly.

Next, operations of the power generation input device 300 will be described with reference to FIG. 13 and FIGS. 29A to 29C to FIGS. 32A and 32B. FIGS. 29A to 29C are drawings illustrating the motions of the sliding member 37, rotating body 36, and rotational magnet body 34 in a case in which an input manipulation is performed in the third embodiment; FIG. 29A is a schematic drawing illustrating a positional relationship in an initial state, FIG. 29B is a schematic drawing illustrating a positional relationship in a state in the middle of the input manipulation, and FIG. 29C is a schematic drawing illustrating a positional relationship at the completion of the input manipulation. In FIGS. 29A to 29C, only the sliding member 37, rotating body 36, and rotational magnet body 34 are illustrated to simplify explanation. FIGS. 30A and 30B are schematic diagrams illustrating a positional relationship among the sliding member 37, rotating body 36, and rotational magnet body 34 in the initial state; FIG. 30A is a side view illustrating the sliding member 37, rotating body 36, and rotational magnet body 34 in a state viewed from the side in the Y2 direction indicated in FIG. 29A, and FIG. 30B is a cross-sectional view taken along line XXXB-XXXB in FIG. 30A. FIGS. 31A and 31B are schematic diagrams illustrating a positional relationship among the sliding member 37, rotating body 36, and rotational magnet body 34 in a state in the middle of the input manipulation; FIG. 31A is a side view illustrating the sliding member 37, rotating body 36, and rotational magnet body 34 in a state viewed from the side in the Y2 direction indicated in FIG. 29B, and FIG. 31B is a cross-sectional view taken along line XXXIB-XXXIB in FIG. 31A. FIGS. 32A and 32B are schematic diagrams illustrating a positional relationship among the sliding member 37, rotating body 36, and rotational magnet body 34 in a state at the completion of the input manipulation; FIG. 32A is a side view illustrating the sliding member 37, rotating body 36, and rotational magnet body 34 in a state viewed from the side in the Y2 direction indicated in FIG. 29C, and FIG. 32B is a cross-sectional view taken along line XXXIIB-XXXIIB in FIG. 32A.

When the manipulating part 37f, of the manipulation member 35, which protrudes upwardly from the case 40 as illustrated in FIG. 13, is pressed downwardly, an input manipulation can be performed on the power generation input device 300. The pressing of the manipulating part 37f enables the rotational magnet body 34 to rotate around the axis SF orthogonal to a direction in which the first facing part 31a and second facing part 31b face each other, as illustrated in FIGS. 29A to 29C. Operations of the power generation input device 300 will be described below in detail.

In an initial state in which an input manipulation is not being performed on the power generation input device 300, the sliding member 37 is held in a state in which it is pressed upwardly (on the side in the Z1 direction) due to an urging force generated by the urging members 39 (see FIGS. 26A and 26B) as illustrated in FIG. 29A. At this time, in the conversion mechanism MC, which is formed by using the cam 37a of the sliding member 37 and the engaging part 36a of the rotating body 36, the engaging part 36a is positioned at the lower end (end in the Z2 direction) of the cam 37a as illustrated in FIG. 30A. At the same time, the sliding member 37 is held in a first orientation PS1 in which the first magnetizing member 34b faces the first facing part 31a and the second magnetizing member 34c faces the second facing part 31b.

When an input manipulation is performed, the sliding member 37 starts to move downwardly from the position in the initial state against the urging force by the urging members 39 (see FIGS. 26a and 26B). At this time, in the conversion mechanism MC, the engaging part 36a comes into contact with the inner wall surface of the cam 37a on its upper side (on the side in the Z1 direction). Since the inner wall surface of the cam 37a on its upper side is inclined with respect to the up-and-down direction, when the cam 37a moves downwardly, the engaging part 36a moves toward the upper end of the cam 37a along the inner wall surface of the cam 37a on its upper side. Thus, the manipulation member 35 gives a driving force to the rotating body 36 through the engaging part 36a, and the rotating body 36 starts to rotate around the axis SF in the direction indicated by the arrows E in FIG. 30B together with the rotational magnet body 34. That is, the conversion mechanism MC converts the sliding manipulation performed for the manipulation member 35 to the rotational operation of the rotational magnet body 34. The sliding member 37 for which the input manipulation has been performed moves to a position lower than in the initial state as illustrated in FIG. 29B. The rotational magnet body 34 also rotates together with the rotating body 36. As a result, the first magnetizing member 34b and second magnetizing member 34c and the first facing part 31a and second facing part 31b have a positional relationship in which the first magnetizing member 34b and second magnetizing member 34c cross the first facing part 31a and second facing part 31b, as illustrated in FIG. 31B. When the manipulating part 37f is further pressed downwardly, the rotating body 36 and rotational magnet body 34 rotate in the direction indicated by the arrows G in FIG. 31B. Then, the sliding member 37 is placed in a second orientation PS2 in which the second magnetizing member 34c faces the first facing part 31a and the first magnetizing member 34b faces the second facing part 31b, as illustrated in FIG. 29C and FIG. 32B. When the input manipulation is ceased, that is, the pressing of the manipulating part 37f is canceled, the sliding member 37 is pressed upwardly by the urging force by the urging members 39 and is returned to the initial state, so the sliding member 37 is placed in the first orientation PS1. Thus, the rotating body 36 rotates in such a way that the first orientation PS1 and second orientation PS2 are alternately switched. In this rotation, the gaps 34e are rotated while being inclined; one of them is inclined with respect to the first facing part 31a and the other is inclined with respect to the second facing part 31b. Due to the rotation, the positional relationship between the first magnetizing member 34b and second magnetizing member 34c and the first facing part 31a and second facing part 31b is changed, so a magnetic field generated by the rotational magnet body 34 for the first facing part 31a and second facing part 31b is changed. Since the first facing part 31a (corresponding to first magnetic member 31c) and the second facing part 31b (corresponding to second magnetic member 31d) are mutually linked by the linking axis 31e (see FIG. 15B) and the coil 32 is wound around the linking axis 31e, when the magnetic field for the first facing part 31a and second facing part 31b changes, a current flows in the coil 32 due to electromagnetic induction. Since the coil 32 is connected to the terminal parts 33a of the terminal 33, the current generated due to electromagnetic induction is output the outside through the terminal parts 33a.

Effects in this embodiment will be described below.

The power generation input device 300 in the third embodiment have had the magnetic member 31 made of a magnetic material, that magnetic member 31 having the first facing part 31a and second facing part 31b that face each other with the space SP left between them and extend in the first direction DR3, the coil 32 wound around the magnetic member 31, the terminal 33 connected to the coil 32, the rotational magnet body 34 rotatable around the axis SF orthogonal to a direction in which the first facing part 31a and second facing part 31b face each other, and the manipulation member 35 that gives a driving force to the rotational magnet body 34. The rotational magnet body 34, which is placed between the first facing part 31a and the second facing part 31b, has had the magnet 34a, the first magnetizing member 34b placed on the same side as one magnetic pole of the magnet 34a, and the second magnetizing member 34c placed on the same side as the other magnetic pole of the magnet 34a. The first magnetizing member 34b and second magnetizing member 34c have extended in the second direction DR4, which crosses the first direction DR3, and have been disposed so as to face each other with two gaps 34e formed between them, one of the two gaps 34e facing the first facing part 31a, the other facing the second facing part 31b. The rotational magnet body 34 has rotated in such a way that the first orientation PS1, in which the first magnetizing member 34b faces the first facing part 31a and the second magnetizing member 34c faces the second facing part 31b, and the second orientation PS2, in which the second magnetizing member 34c faces the first facing part 31a and the first magnetizing member 34b faces the second facing part 31b, are alternately switched; in this rotation, one of the gaps 34e is inclined with respect to the first facing part 31a and the other gap 34e is inclined with respect to the second facing part 31b.

Since the rotational magnet body 34 is rotated in a state in which the second direction DR4, in which the gaps 34e extend, crosses the first direction DR3, along which the first facing part 31a and second facing part 31b extend, that is, the rotational magnet body 34 is inclined, one of the gaps 34e crosses the direction along which the first facing part 31a extends, starting from one end of the gap 34e. As the rotational magnet body 34 is rotated, the gap 34e moves while gradually changing, toward the other end, its portion that crosses the direction along which the first facing part 31a extends. The other gap 34e crosses the direction along which the second facing part 31b extends in the same way. Therefore, a magnetic field applied to the magnetic member 31 can be gradually changed. By adjusting the angle of the inclination of the gaps 34e with respect to the first facing part 31a and second facing part 31b, a cogging torque (magnetic torque) can be adjusted, so a desired manipulation feeling can be obtained. A magnetic torque generated at, for example, an inclination angle of 0 degree can be reduced when the rotational magnet body 34 is in a state in which the inclination angle is 20 degrees. In a state in which the inclination angle is 30 degrees, the magnetic torque can be further reduced. Therefore, it is preferable to reduce the inclination angle in a case in which a clear manipulation feeling is desirable and to increase the inclination angle in a case in which there is a desire to eliminate the feeling of a torque.

In the power generation input device 300 in the third embodiment, the second direction DR4 has been preferably a direction along the axis SF and the magnetic member 31 has been preferably structured so that at least the first facing part 31a and second facing part 31b extend in a direction inclined with respect to the axis SF.

Since the gaps 34e are formed so as to extend in a direction along the axis SF and the first facing part 31a and second facing part 31b, which are at least part of the magnetic member 31, extend in a direction inclined with respect to the axis SF, the direction (second direction DR4) in which the gaps 34e extend can be inclined with respect to the direction (first direction DR3) in which the first facing part 31a and second facing part 31b extend.

In the power generation input device 300 in the third embodiment, the magnetic member 31 has been preferably formed in a plate-like shape and the first direction DR3 has been preferably inclined with respect to the axis SF by bending part of the magnetic member 31.

Since the first facing part 31a and second facing part 31b are formed by bending part of the magnetic member 31 made of a plate material, there is no need to incline the whole of the magnetic member 31. Therefore, the magnetic member 31 can be placed in a small space, and the whole of the power generation input device 300 can thereby be made compact. By changing an angle through which the first facing part 31a and second facing part 31b are bent, the angle of the inclination of the direction in which they extend with respect to the direction in which the gaps 34e extend can be easily set.

In the power generation input device 300 in the third embodiment, the manipulation member 35 has preferably had the conversion mechanism MC formed by using the cam 37a and the engaging part 36a guided by the cam 37a; the conversion mechanism MC has preferably converted a sliding manipulation performed for the manipulation member 35 to the rotational operation of the rotational magnet body 34.

Therefore, a sliding manipulation performed for the manipulation member 35 can be converted to the rotational operation of the rotational magnet body 34 with a simple structure.

So far, the power generation input devices in the embodiments of the present invention have been specifically described. However, the present invention is not limited to the embodiments described above. Various changes are possible in the present invention without departing from the intended scope of the present invention. For example, the present invention can also be practiced by making variations as described below. These variations are also included in the technical range of the present invention.

Although, in the first and second embodiments, the first driving groove 1c has been extended so as to be inclined with respect to the rotational center line SL in the direction indicated by the arrow A in FIG. 4D and the second driving groove 1d has been extended so as to be inclined with respect to the rotational center line SL in the direction, indicated by the arrow B, that is opposite to the direction in which the first driving groove 1c is inclined, the direction in which the first driving groove 1c is inclined and the direction in which the second driving groove 1d is inclined may be reversed.

Although, in the first and second embodiments, the rotational body 2 has had the rotational axis 2a and the supporting body 3 has had rotational bearing 3a, the rotational body 2 may have a rotational bearing and the supporting body 3 may have a rotational axis.

In the first and second embodiments, electric power has been generated by performing an input manipulation. However, a transmitter, a light emitting diode (LED), and the like may be incorporated and electric power may be supplied to these constituent components.

In the first embodiment, the gap 4k formed on the side in the X1 direction in FIGS. 7A and 7B has been inclined from the Y2 direction toward the Y1 direction as the gap 4k extends in the Z2 direction and the gap 4k formed on the side in the X2 has been inclined from the Y1 direction toward the Y2 direction as the gap 4k extends in the Z2 direction.

However, the gaps 4k may be inclined in directions opposite to the directions in the first embodiment.

In the second embodiment, on one side of the N-pole inclined piece 4n and S-pole inclined piece 4m, the N-pole inclined piece 4n has been formed in a mountain-shape and the S-pole inclined piece 4m has been formed in a valley-shape; on the other side, the N-pole inclined piece 4n has been formed in a valley-shape and the S-pole inclined piece 4m has been formed in a mountain-shape. However, these combinations of the mountain-shape and valley-shape in the second embodiment may be reversed.

In the third embodiment, the second direction DR4 has been preferably a direction along the axis SF and at least the first facing part 31a and second facing part 31b of the magnetic member 31 have preferably extended in a direction inclined with respect to the axis SF. However, the first direction DR3 may be a direction along the axis SF, and the second direction DR4 may be inclined with respect to the axis SF by forming a pair of inclined surfaces 34d on the opposing surfaces of the first magnetizing member 34b and second magnetizing member 34c to form the gaps 34e with a pair of inclined surfaces 34d. Accordingly, the direction (second direction DR4) in which the gaps 34e extend can be inclined with respect to the axis SF by forming the pair of inclined surfaces 34d on the opposing surfaces of the first magnetizing member 34b and second magnetizing member 34c to form the gaps 34e with the pair of inclined surfaces 34d.

What is claimed is:

1. A power generation input device comprising:
a rotational magnet body that has a magnet, an N-pole member placed on the same side as an N pole of the magnet, and an S-pole member placed on the same side as an S-pole of the magnet, the rotational magnet body being supported so as to be rotatable around a rotational center line disposed between the N-pole member and the S-pole member so as to pass through the magnet;
a magnetic member disposed so as to sandwich the rotational magnet body with ends of the magnetic member so that when one of the ends comes close to the N pole, another of the ends comes close to the S-pole and that when the one of the ends comes close to the S-pole, the another of the ends comes close to the N pole;
a coil wound around the magnetic member; and
a manipulation body that drives rotation of the rotational magnet body; wherein:
the N-pole member has an N-pole end, which extends in a direction more away from the rotational center line than an end of the magnet, in a direction that is orthogonal to the rotational center line and is also orthogonal to a direction in which the N-pole member and the S-pole member face each other, the S-pole member has an S-pole end, which extends in a direction more away from the rotational center line than the end of the magnet, in the direction that is orthogonal to the rotational center line and is also orthogonal to the direction in which the N-pole member and the S-pole member face each other, and
the N-pole end and the S-pole end are oppositely disposed in a plane parallel to the rotational center line with a gap intervening between the N-pole end and the S-pole end, the gap extending in a direction inclined with respect to the rotational center line.

2. The power generation input device according to claim 1, wherein:

an N-pole inclined piece is at the N-pole end of the N-pole member so as to extend toward the S-pole end and an S-pole inclined piece is at the S-pole end of the S-pole member so as to extend toward the N-pole end; and the gap is defined by disposing the N-pole end and the S-pole end so as to face each other and disposing the N-pole inclined piece and the S-pole inclined piece so as to face each other.

3. The power generation input device according to claim 1, wherein one of the N-pole inclined piece and the S-pole inclined piece has a mountain-shape by combining a pair of inclinations, and the other of the N-pole inclined piece and the S-pole inclined piece has a valley-shape by combining a pair of inclinations.

4. A power generation input device comprising:

a magnetic member made of a magnetic material, the magnetic member having a first facing part and a second facing part that face each other with a space left between the first facing part and the second facing part and extend in a first direction;

a coil wound around the magnetic member;

a terminal connected to the coil;

a rotational magnet body rotatable around an axis orthogonal to a direction in which the first facing part and the second facing part face each other; and a manipulation member that gives a driving force to the rotational magnet body; wherein the rotational magnet body, which is placed between the first facing part and the second facing part, has a magnet, a first magnetizing member placed on the same side as one magnetic pole of the magnet, and a second magnetizing member placed on the same side as another magnetic pole of the magnet, the first magnetizing member and the second magnetizing member extending in a second direction, which crosses the first direction, the first magnetizing member and the second magnetizing member being disposed so as to face each other with gaps formed between the first magnetizing member and the second magnetizing member, one of the gaps facing the first facing part, another of the gaps facing the second facing part, and the rotational magnet body rotates in such a way that a first orientation, in which the first magnetizing member faces the first facing part and the second magnetizing member faces the second facing part, and a second orientation, in which the second magnetizing member faces the first facing part and the first magnetizing member faces the second facing part, are alternately switched, and in rotation of the rotational magnet body, the one of the gaps is inclined with respect to the first facing part and the another of the gaps is inclined with respect to the second facing part.

5. The power generation input device according to claim 4, wherein:

the second direction is a direction along the axis; and the magnetic member is configured so that at least the first facing part and the second facing part extend in a direction inclined with respect to the axis.

6. The power generation input device according to claim 5, wherein:

the magnetic member has a plate-like shape; and the first direction is inclined with respect to the axis by bending part of the magnetic member.

7. The power generation input device according to claim 4, wherein:

the first direction is a direction along the axis; and the second direction is inclined with respect to the axis by forming a pair of inclined surfaces on opposing surfaces of the first magnetizing member and the second magnetizing member to form the gaps with the pair of inclined surfaces.

8. The power generation input device according to claim 4, wherein:

the manipulation member has a conversion mechanism formed by using a cam and an engaging part guided by the cam; and the conversion mechanism converts a sliding manipulation performed for the manipulation member to rotational operation of the rotational magnet body.

* * * * *